(12) United States Patent
Konakawa et al.

(10) Patent No.: US 8,113,893 B2
(45) Date of Patent: Feb. 14, 2012

(54) EXHAUST DEVICE FOR OUTBOARD MOTOR MULTI-CYLINDER ENGINE

(75) Inventors: Tsugunori Konakawa, Shizuoka (JP); Yusuke Takahashi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 183 days.

(21) Appl. No.: 12/503,247

(22) Filed: Jul. 15, 2009

(65) Prior Publication Data
US 2010/0022148 A1    Jan. 28, 2010

(30) Foreign Application Priority Data

Jul. 22, 2008   (JP) .................................. 2008-188428

(51) Int. Cl.
*F01N 3/28* (2006.01)
*F01N 13/00* (2006.01)

(52) U.S. Cl. ..................................... 440/89 H; 440/89 J
(58) Field of Classification Search ................ 440/88 A, 440/88 HE, 89 C, 89 H, 89 J, 89 F
See application file for complete search history.

(56) References Cited

U.S. PATENT DOCUMENTS

| 4,154,058 | A | * | 5/1979 | Mase et al. ........................ 60/293 |
| 4,354,349 | A | * | 10/1982 | Otani et al. ...................... 60/299 |
| 6,632,110 | B2 | * | 10/2003 | Kato ........................... 440/89 H |
| 6,840,038 | B2 | * | 1/2005 | Katayama et al. ............... 60/312 |
| 2002/0083703 | A1 | * | 7/2002 | Werth et al. | |
| 2008/0022669 | A1 | * | 1/2008 | Konakawa et al. | |

FOREIGN PATENT DOCUMENTS

JP   2005-022509 A   *   1/2005

* cited by examiner

*Primary Examiner* — Lars A Olson
*Assistant Examiner* — Andrew Polay
(74) *Attorney, Agent, or Firm* — Keating & Bennett, LLP

(57) ABSTRACT

An exhaust device for an outboard motor multi-cylinder engine includes an exhaust passage having a first end connected to the multi-cylinder engine, a catalyst provided in the exhaust passage, and an exhaust chamber connected to a second end of the exhaust passage as well as to a main exhaust passage positioned below the engine. The exhaust passage includes upstream portions for cylinders which have inlet ends respectively connected to exhaust gas outlets of a plurality of cylinders whose exhaust valve opening periods are different, a collecting portion arranged to connect the outlet ends of these upstream portions to each other, and a plurality of downstream portions which are branched from the collecting portion and connected commonly to the exhaust chamber. The catalyst is provided in each of the plurality of downstream portions.

6 Claims, 18 Drawing Sheets

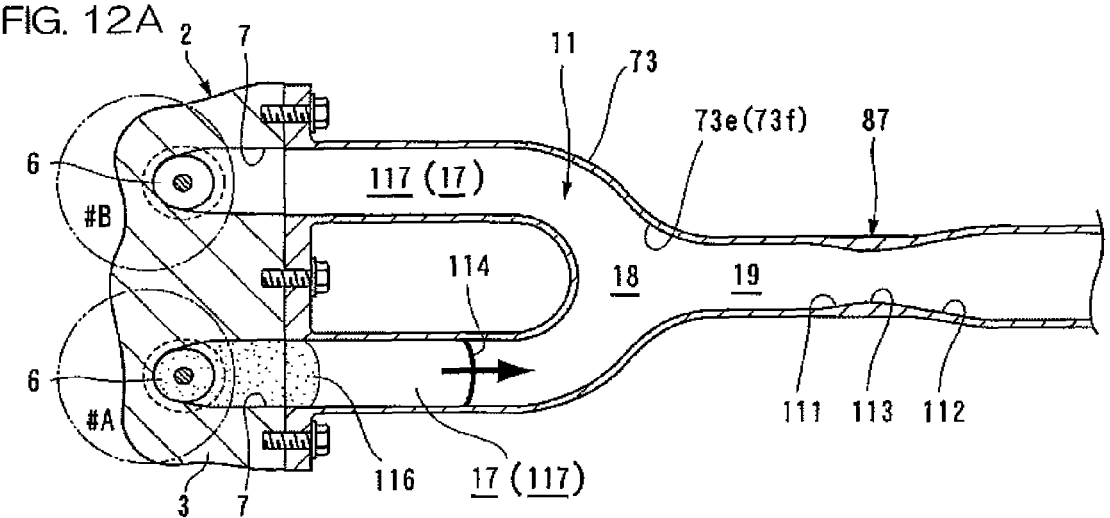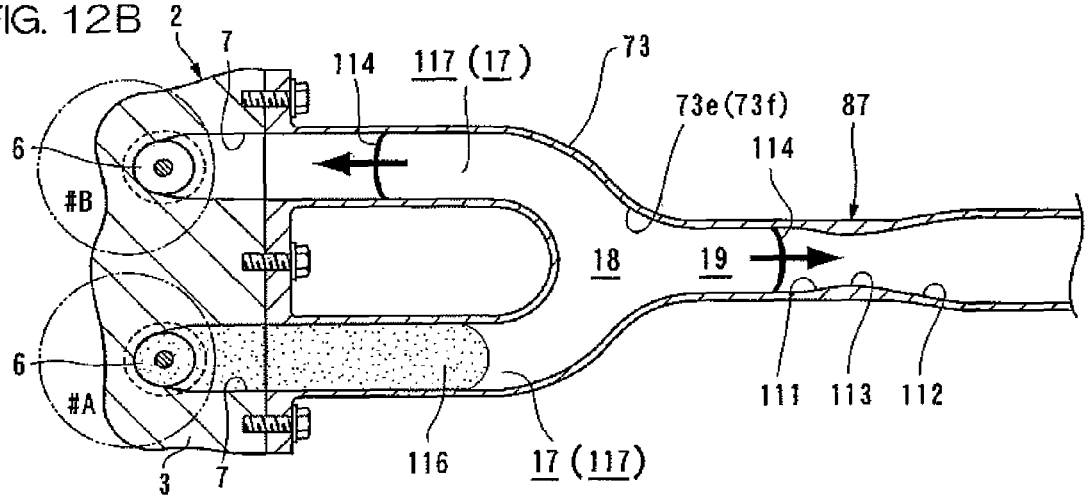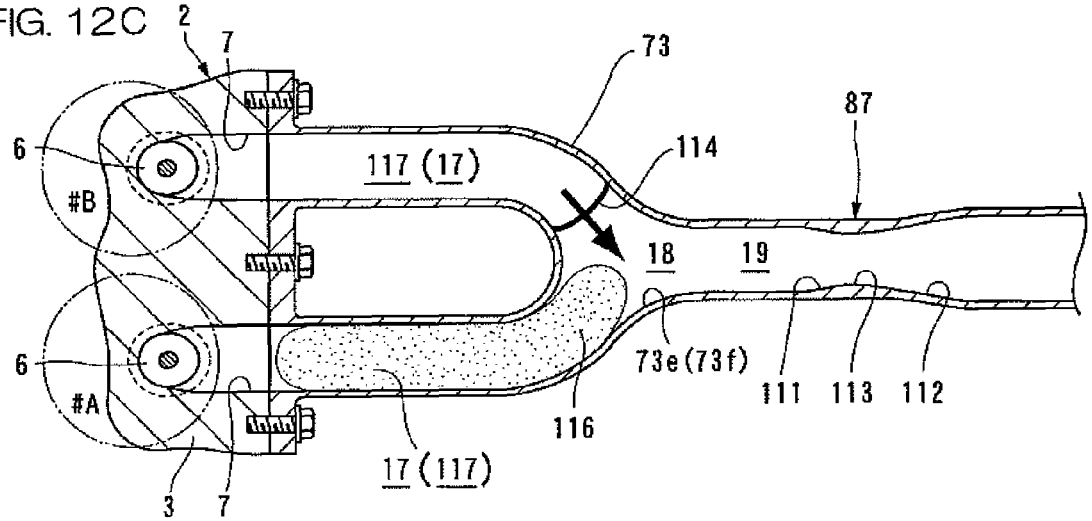

EXHAUST DEVICE FOR OUTBOARD MOTOR MULTI-CYLINDER ENGINE

BACKGROUND OF THE INVENTION

1. Field of the Invention

The present invention relates to an exhaust device of a multi-cylinder engine including a catalyst arranged to purify an exhaust gas discharged from an outboard motor multi-cylinder engine.

2. Description of Related Art

One example of an exhaust device of a multi-cylinder engine is described in Japanese Published Unexamined Patent Application No. 2005-22509. This exhaust device is provided for a 4-cylinder engine for a two-wheeled motor vehicle, and includes an exhaust pipe which collects exhaust passages of cylinders in one passage. A catalyst is provided on the upstream side of the collecting portion in the exhaust pipe.

On the other hand, in U.S. Patent Application Publication No. 2008/022669A1, an example of an outboard motor is disclosed. This outboard motor includes an engine which supports a crankshaft in an up-down direction, a casing positioned below the engine, and a cowling surrounding the engine. The engine is a multi-cylinder engine. The outboard motor includes an exhaust pipe which connects the engine and a main exhaust passage inside the casing for preventing exhaust interference among cylinders of the engine.

The lower end of the crankshaft is connected to a drive shaft. The drive shaft is housed in the casing and extends in an up-down direction. The lower end of the drive shaft is coupled to a propeller supported rotatably on the lower end of the casing.

The main exhaust passage is formed to penetrate the inside of the casing in the up-down direction. An inlet end of the main exhaust passage is connected to exhaust outlets of the cylinder heads via an exhaust pipe. Also, the outlet end of the main exhaust passage opens in water at the shaft center of the propeller.

The exhaust pipe has a tubular portion forming exhaust passages of the cylinders. The plurality of exhaust passages are connected commonly to an exhaust chamber and collected together. The exhaust chamber is connected to the main exhaust passage.

The tubular portion includes an exhaust manifold portion positioned between two cylinder heads. The tubular portion further includes a horizontal pipe portion extending from the exhaust manifold portion. In this horizontal pipe portion, two catalysts are disposed in series.

SUMMARY OF THE INVENTION

The inventor of the invention described and claimed in the present application conducted an extensive study and research regarding the design and development of an outboard motor, and in doing so, discovered and first recognized new unique challenges and problems created by the interplay and trade-off relationships of the combination of various problems with outboard motors. In view of the inventor's discovery of these new unique challenges and problems, the inventor further discovered and developed the preferred embodiments of the present invention, described in greater detail below, to provide unique solutions to previously unrecognized and unsolved problems.

More specifically, in an exhaust device for a multi-cylinder engine including catalysts provided in the exhaust passages communicating with a plurality of cylinders, a self-ignition phenomenon and knocking may easily occur. The self-ignition phenomenon is a phenomenon in which ignition naturally occurs before ignition is performed with an ignition plug in the engine.

If the self-ignition phenomenon occurs, the output of the engine lowers. If knocking frequently occurs, a shock wave generated inside the combustion chamber due to knocking breaks a gas film (boundary layer) on the surface inside the cylinder.

If this gas film is broken, flames produced by combustion come into direct contact with the metal surfaces (cylinder inner peripheral surface, piston top surface, and cylinder head surface, etc.) inside the cylinder. These metal surfaces are easily melted by heat when they are directly exposed to the flame. If these metal surfaces are melted, this can finally result in breakage of the engine.

If the ignition timing of the engine is delayed to prevent the occurrence of knocking, the torque of the engine lowers, and the temperature of the exhaust gas rises, so that the temperature of the catalyst may become excessively high.

One problem that was known was the problem of the catalyst being deteriorated by a so-called sintering phenomenon if it is continuously exposed to an excessively high temperature, and the purifying efficiency is deteriorated. This sintering phenomenon is a phenomenon in which the catalyst is held at a high temperature not less than 850° C. for a long period and noble metals in the catalyst thermally adhere to each other and reduce the surface area of the noble metals.

The reason for the easy occurrence of the self-ignition phenomenon and knocking is considered to be the configuration of the exhaust passage. In other words, pressures of exhaust gases discharged from the cylinders are transmitted to the exhaust passages of other cylinders via the exhaust hole, and the pressures in the exhaust passages of the respective cylinders become relatively high. The exhaust resistance is made higher by the catalyst, which is also considered as one of the causes of the higher pressures in the exhaust passages.

If the pressures inside the exhaust passages are high, in each cylinder, the exhaust gas becomes more difficult to discharge into the exhaust passage in the exhaust stroke, and the amount of exhaust gas remaining in the cylinder increases. That is, inside the cylinder, a large amount of exhaust gas is introduced due to so-called internal EGR (Exhaust Gas Recirculation). Then, while an exhaust gas at a high temperature remains in the cylinder, in an intake stroke, new air is suctioned into the cylinder. This new air (intake air) is mixed with the exhaust gas at a high temperature inside the cylinder, and as a result, the temperature of the intake air is raised by the heat of the exhaust gas.

If the temperature of the intake air inside the cylinder becomes excessively high, abnormal combustion such as self-ignition and knocking easily occurs.

To reduce the pressure in the exhaust passage, reduction of the exhaust resistance in the exhaust passage was found to be effective. However, in the outboard motor, the space which can be secured for exhaust inside the outboard motor is limited. In this limited space, it is not easy to realize a layout of exhaust passages in which the exhaust resistance can be reduced.

Thus, the inventor discovered and carefully studied the many varying problems described above, and recognized certain unique and unsolved interrelationships and trade-offs, and the effects of various unique solutions on such diverse and numerous problems. After diligent research and work on such unique problems and novel potential solutions, the preferred embodiments of the present invention were discovered and developed.

A preferred embodiment of the present invention provides an exhaust device for an outboard motor engine having a plurality of cylinders. The exhaust device includes an exhaust passage having a first end that is connected to the engine and a second end, and an exhaust chamber which is connected to the second end of the exhaust passage and to a main exhaust passage positioned below the engine. The exhaust passage includes a plurality of upstream portions each provided for a respective one of the plurality of cylinders and including inlet ends connected to exhaust gas outlets of the plurality of cylinders whose exhaust valve opening periods are different, a collecting portion arranged to connect outlet ends of the upstream portions to each other, and a plurality of downstream portions which are branched from the collecting portion and connected commonly to the exhaust chamber. A plurality of catalysts is provided and one of the catalysts is provided in each of the plurality of downstream portions.

With this configuration, exhaust gases discharged to the upstream portions of the exhaust passage from the respective cylinders of the engine pass through the collecting portion and are distributed to the plurality of downstream portions, and flow into the catalysts. Therefore, as compared to an exhaust device in which the total amount of the exhaust gas discharged from one cylinder flows into one catalyst, the exhaust resistance can be reduced. Exhaust gases do not flow simultaneously into the downstream portions from the plurality of cylinders, so that the influence of the pressures of exhaust gases of other cylinders, that is, exhaust interference, can be minimized.

Therefore, as compared to an exhaust device configured such that exhaust gases of all cylinders pass through one catalyst, the exhaust resistance is greatly reduced and minimized, and in addition, exhaust interference does not occur. Accordingly, the pressure in the exhaust passage is effectively lowered, so that the amount of exhaust gas remaining inside the cylinders due to the internal EGR is greatly reduced and minimized.

As a result, the temperature of intake air suctioned into the cylinders in the intake stroke becomes relatively low, so that an occurrence of abnormal combustion such as the above-described self-ignition and knocking is reliably prevented.

In addition, the structure of the exhaust passage having the upstream portions for the cylinders, a collecting portion which collects the upstream portions, and a plurality of downstream portions branched from the collecting portion, can be provided without requiring a large space. Therefore, the exhaust passage which can sufficiently lower the exhaust resistance can be provided in a limited space inside the outboard motor.

In a preferred embodiment of the present invention, the engine preferably is arranged to support a crankshaft extending along an up-down direction of the outboard motor, exhaust gas outlets of the cylinders are located on the side portion of the engine, and the exhaust passage is arranged to extend from the exhaust gas outlets to a vicinity of the crankshaft in a plan view.

The exhaust chamber may be disposed on the opposite side of the exhaust gas outlets with respect to the engine. The exhaust passage may extend from the exhaust gas outlets and bypass the engine along the crank case in a plan view, and is connected to the exhaust chamber.

In a preferred embodiment of the present invention, an air introducing passage is connected to the collecting portion of the exhaust passage. Into this air introducing passage, air which has not passed through the insides of the cylinders of the engine is introduced. Such air may be referred to as "secondary air" in this specification.

In a preferred embodiment of the present invention, nozzles are disposed on the upstream sides of the catalysts in the downstream portions of the exhaust passage. Each of the nozzles may have a narrowing portion at which the cross-section area of the exhaust path is gradually reduced toward the downstream side thereof, and an expanding portion at which the cross-section area of the exhaust path gradually increases toward the downstream side between the narrowing portion and the catalyst. The nozzle may be a supersonic nozzle. In the supersonic nozzle, when a ratio of the pressure of the upstream of the narrowing portion and the pressure of the downstream of the expanding portion becomes less than a critical pressure ratio, the exhaust gas flow rate in the throat portion reaches the sonic speed, and in the expanding portion, the exhaust gas is accelerated to a supersonic speed.

An outboard motor according to another preferred embodiment of the present invention includes an exhaust passage having a first end that is connected to the engine and a second end, and an exhaust chamber which is connected to the second end of the exhaust passage and to a main exhaust passage positioned below the engine. The exhaust passage includes a plurality of upstream portions each provided for a respective one of the plurality of cylinders and including inlet ends connected to exhaust gas outlets of the plurality of cylinders whose exhaust valve opening periods are different, a collecting portion arranged to connect outlet ends of the upstream portions to each other, and a plurality of downstream portions which are branched from the collecting portion and connected commonly to the exhaust chamber. A plurality of catalysts is provided and one of the catalysts is provided in each of the plurality of downstream portions.

Other elements, features, arrangements, steps, characteristics and advantages of the present invention will become more apparent from the following detailed description of the preferred embodiments with reference to the attached drawings.

BRIEF DESCRIPTION OF THE DRAWINGS

FIGS. 12A, FIG. 12B, and FIG. 12C are sectional views for describing advancing states of a shock wave and an exhaust gas, wherein FIG. 12A shows an initial state of an exhaust stroke, FIG. 12B shows a state in which the shock wave propagates into a branched passage, and FIG. 12C shows a state in which the shock wave reflected by the branched passage and the exhaust gas collides with each other.

In FIG. 17, the exhaust pipe and the secondary air introducing pipe are illustrated as partially broken.

In FIG. 18, the secondary air introducing pipe, the reed valves, and a portion of the communicating pipe are illustrated as partially broken.

DETAILED DESCRIPTION OF THE PREFERRED EMBODIMENTS

First Preferred Embodiment

Hereinafter, an exhaust device for an outboard motor multi-cylinder engine of a first preferred embodiment of the present invention will be described in detail with reference to FIG. 1.

Figure 1:
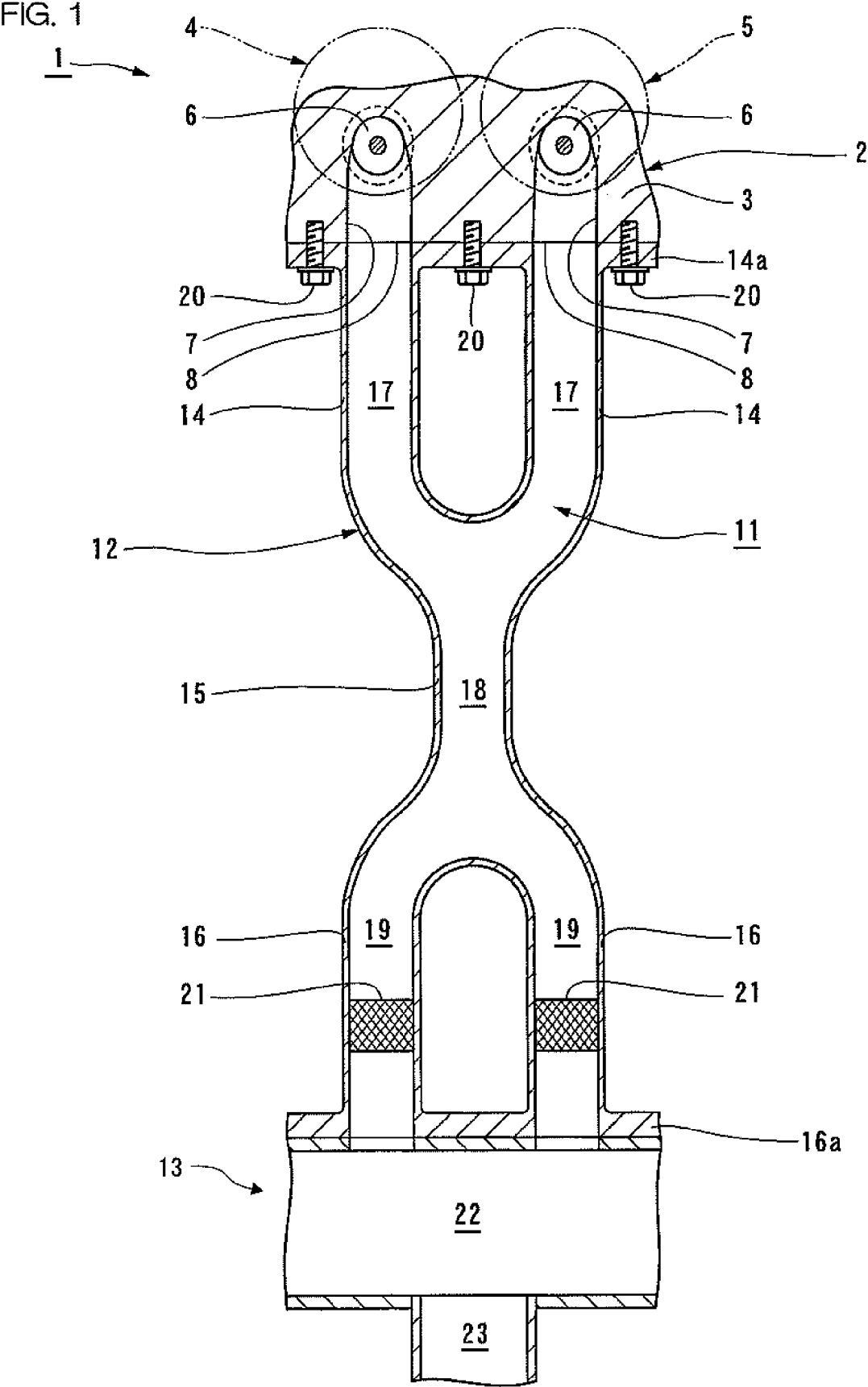
FIG. 1 is a sectional view showing a configuration of an exhaust device for an outboard motor multi-cylinder engine of a first preferred embodiment of the present invention.

The exhaust device 1 shown in FIG. 1 is attached to the cylinder head 3 of a 4-cycle multi-cylinder engine 2, and connected to a first cylinder 4 and a second cylinder 5 of the engine 1. The multi-cylinder engine 2 preferably is an outboard motor engine, for example.

The first cylinder 4 and the second cylinder 5 are cylinders whose exhaust valves 6 open in different time periods (without overlap). For example, it is assumed that the engine 2 is a 4-cylinder engine and the cylinder #1, the cylinder #3, the cylinder #4, and the cylinder #2 are ignited in this order, for example. In this case, the pair of the cylinder #1 and the cylinder #4 corresponds to the pair of two cylinders 4 and 5. Other pair of the cylinder #2 and the cylinder #3 corresponds to the pair of the two cylinders 4 and 5. In other words, in the 4-cylinder engine, two pairs of cylinders can correspond to the two cylinders 4 and 5.

In the cylinder head 3, one exhaust port 7 is provided per one cylinder, and exhaust valves 6 for opening and closing the exhaust ports 7 are provided. The downstream end of the exhaust ports 7 open on the outer side surface of the cylinder head 3. The openings define exhaust gas outlets 8.

The exhaust device 1 of this preferred embodiment includes an exhaust pipe 12 that defines an exhaust passage 11 connected to the two cylinders 4 and 5, and an exhaust chamber 13 connected to the downstream side end of the exhaust pipe 12.

The exhaust pipe 12 includes (two) upstream pipes 14 and 14 for the respective cylinders each connected to the exhaust gas outlets 8 and 8 of the two cylinders 4 and 5, a collecting pipe 15 which connects the downstream ends of the upstream pipes 14 to each other, and two downstream pipes 16 and 16 branched from the collecting pipe 15.

The space formed inside the exhaust pipe 12 defines the exhaust passage 11. The spaces inside the upstream pipes 14 define upstream portions 17 of the exhaust passage 11. The space inside the collecting pipe 15 defines a collecting portion 18 of the exhaust passage 11. The spaces inside the downstream pipes 16 define downstream portions 19 of the exhaust passage 11.

At the inlet ends of the upstream pipes 14, an attaching flange 14a is provided. The upstream pipes 14 are attached to the cylinder head 3 via the flange 14a. The flange 14a is attached to the cylinder head 3 preferably via attaching bolts 20, for example. Two upstream pipes 14 and 14 preferably have lengths equal to each other.

The upstream side end of the collecting pipe 15 preferably has a substantially U-sectional shape opening to the upstream side, and is connected to two upstream pipes 14. The downstream side end of the collecting pipe 15 preferably has a substantially U-sectional shape opening to the downstream side, and is connected to two downstream pipes 16. The shapes of the connecting portions between the collecting pipe 15 and the upstream pipes 14 and the downstream pipes 16 are not limited to the U sectional shapes show in FIG. 1, and can be modified as appropriate.

The inner diameter of the collecting pipe 15 shown in FIG. 1 preferably is substantially equal to the inner diameter of the upstream pipes 14 and the inner diameter of the downstream pipes 16. However, the inner diameter of the collecting pipe 15 can be larger than the inner diameter of the upstream pipes 14 and the inner diameter of the downstream pipes 16, for example.

The downstream pipes 16 have an attaching flange 16a on the downstream side ends. The downstream pipes 16 are attached commonly to one exhaust chamber 13 by the flange 16a. Two downstream pipes 16 and 16 preferably have lengths equal to each other. In the two exhaust pipes 16 and 16, catalysts 21 are provided, respectively. In this preferred embodiment, an example including two downstream pipes 16 is shown, however, three or more downstream pipes 16 can be provided, for example.

The number of the exhaust pipes 12 is increased at a rate of one per two cylinders when the number of cylinders is larger than two as in the case of the engine 2, which in the present preferred embodiment preferably is a 4-cylinder engine, for example. In each case, the exhaust pipe 12 is connected to two cylinders whose exhaust valves 5 open in different time periods.

The exhaust chamber 13 has an expansion chamber 22 to which exhaust gases are discharged from the plurality of downstream pipes 16, and discharges the exhaust gases to the main exhaust passage 23 on the downstream side via the expansion chamber 22. The main exhaust passage 23 is provided with a muffler although this is not shown.

As in the case where the number of cylinders of the engine 2 is not less than three, when a plurality of the exhaust pipes 12 are provided, downstream pipes 16 of all of these exhaust pipes 12 can be connected to one exhaust chamber 13.

In the exhaust device 1 of the multi-cylinder engine 2 thus configured, the exhaust gas of the engine 2 is led to the catalysts 21 by the exhaust pipe 12 from the insides of the cylinders (the first and second cylinders 4 and 5). The exhaust gas is purified by the catalysts 21, and then discharged through the exhaust chamber 13 and the muffler (not shown). The exhaust gases discharged to the upstream portions 17 of the exhaust passage 11 from the cylinders 4 and 5 of the engine 2 pass through the collecting portion 18 and are then distributed to the two downstream portions 19, and flow into the catalysts 21, respectively.

Therefore, according to this preferred embodiment, as compared to an exhaust device configured such that the total amount of the exhaust gas discharged from one cylinder flows into one catalyst, the exhaust resistance can be reduced. In addition, exhaust gases do not flow simultaneously into the downstream portions 19 from the plurality of cylinders, so that the influence of the pressures of the exhaust gases of other cylinders, that is, exhaust interference, does not occur.

Therefore, with the exhaust device 1 of this preferred embodiment, the exhaust resistance is greatly reduced and minimized as compared to that in the exhaust device configured such that exhaust gases of all cylinders are made to pass through one catalyst. In addition, exhaust interference does not occur. Therefore, the pressure inside the exhaust passage 11 can be relatively lowered.

By thus relatively lowering the pressure inside the exhaust passage 11, the exhaust gas is efficiently discharged into the exhaust pipe 12 from the combustion chamber (not shown) in the exhaust stroke of the engine 2. As a result, the amount of exhaust gas remaining in the cylinders can be reduced.

Thus, the temperature of intake air suctioned into the cylinders in the intake stroke becomes relatively low, so that an occurrence of abnormal combustion such as the above-described self-ignition and knocking can be reliably prevented.

In addition, the exhaust pipe 12 including the upstream pipes 14 for the respective cylinders, the collecting pipe 15 which collects the upstream pipes, and the downstream pipes 16 branched from the collecting portion 15, can be provided without requiring a large space. Therefore, the exhaust passage which can sufficiently reduce the exhaust resistance can be provided in a limited space inside the outboard motor.

Second Preferred Embodiment

An exhaust device of a multi-cylinder engine according to a second preferred embodiment of the present invention can be configured as shown in FIG. 2 to FIG. 16. Here, an example in which a preferred embodiment of the present invention is provided in an outboard motor 4-cylinder engine is described. In FIG. 2 to FIG. 16, members identical or equivalent to those described in FIG. 1 will be assigned with the same reference numerals, and detailed description thereof will be omitted as appropriate.

Figure 2:
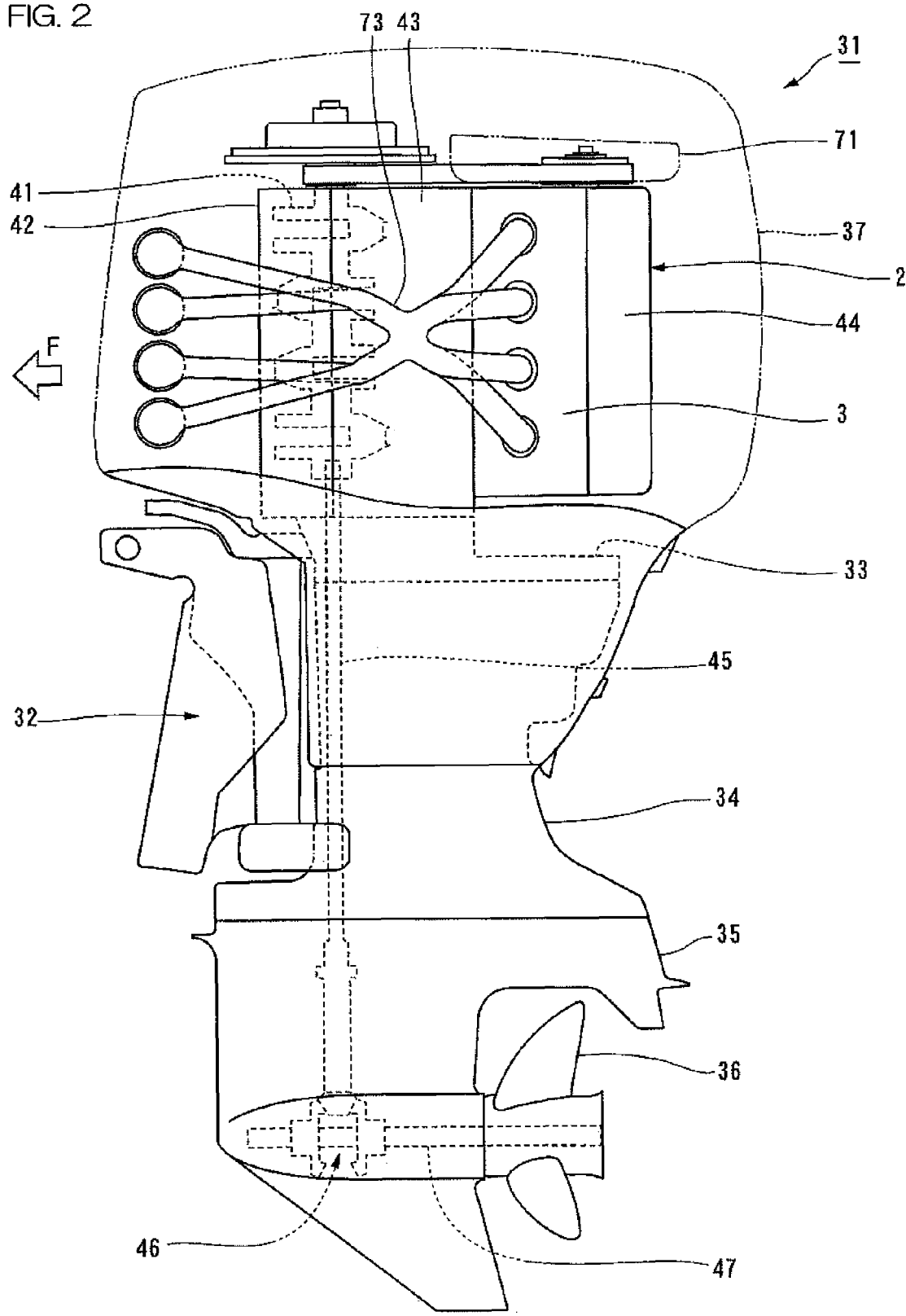
FIG. 2 is a side view of an outboard motor equipped with an exhaust device for an outboard motor multi-cylinder engine of a second preferred embodiment of the present invention.
Figure 5:
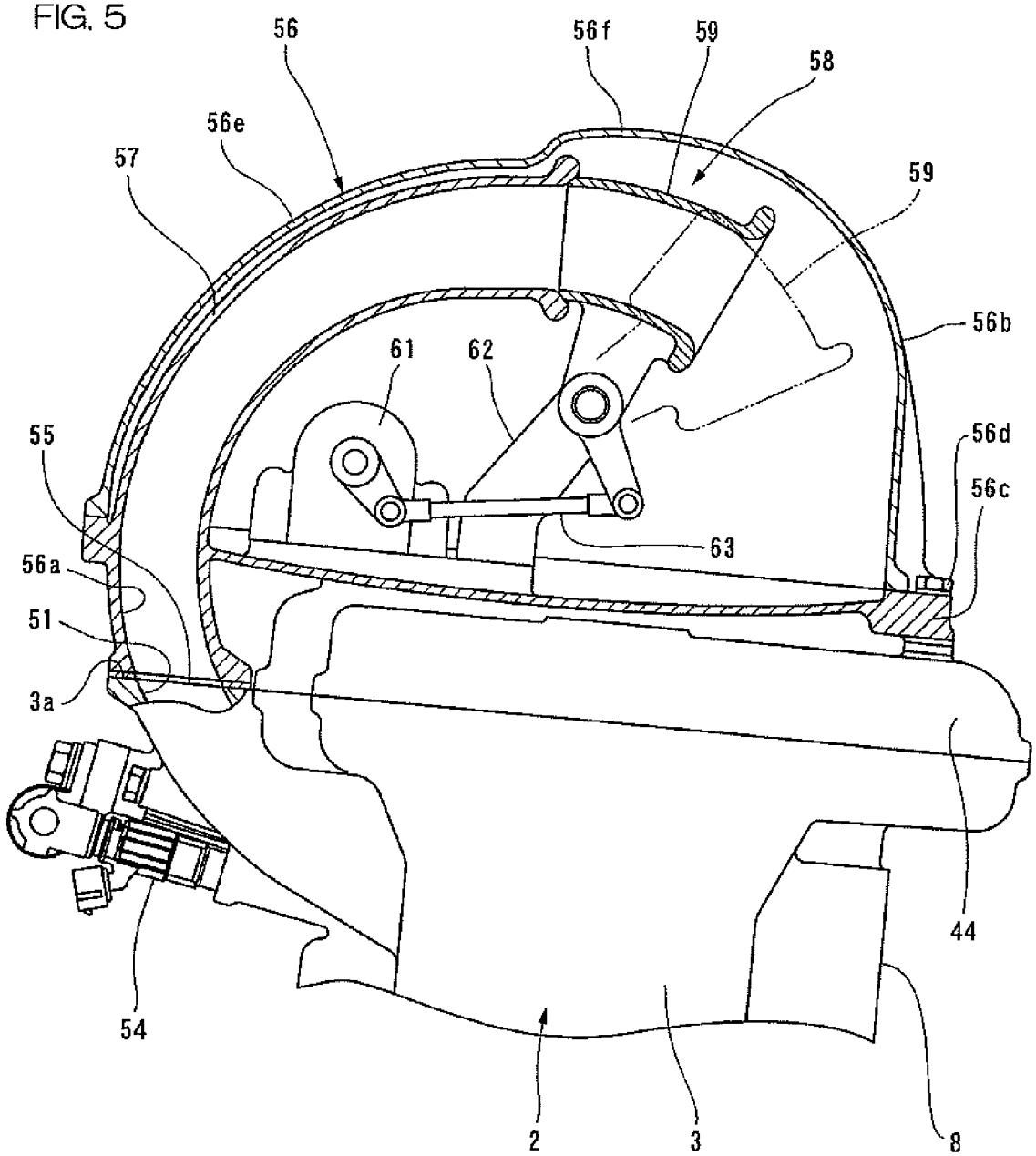
FIG. 5 is a sectional view of an intake surge tank portion.
Figure 6:
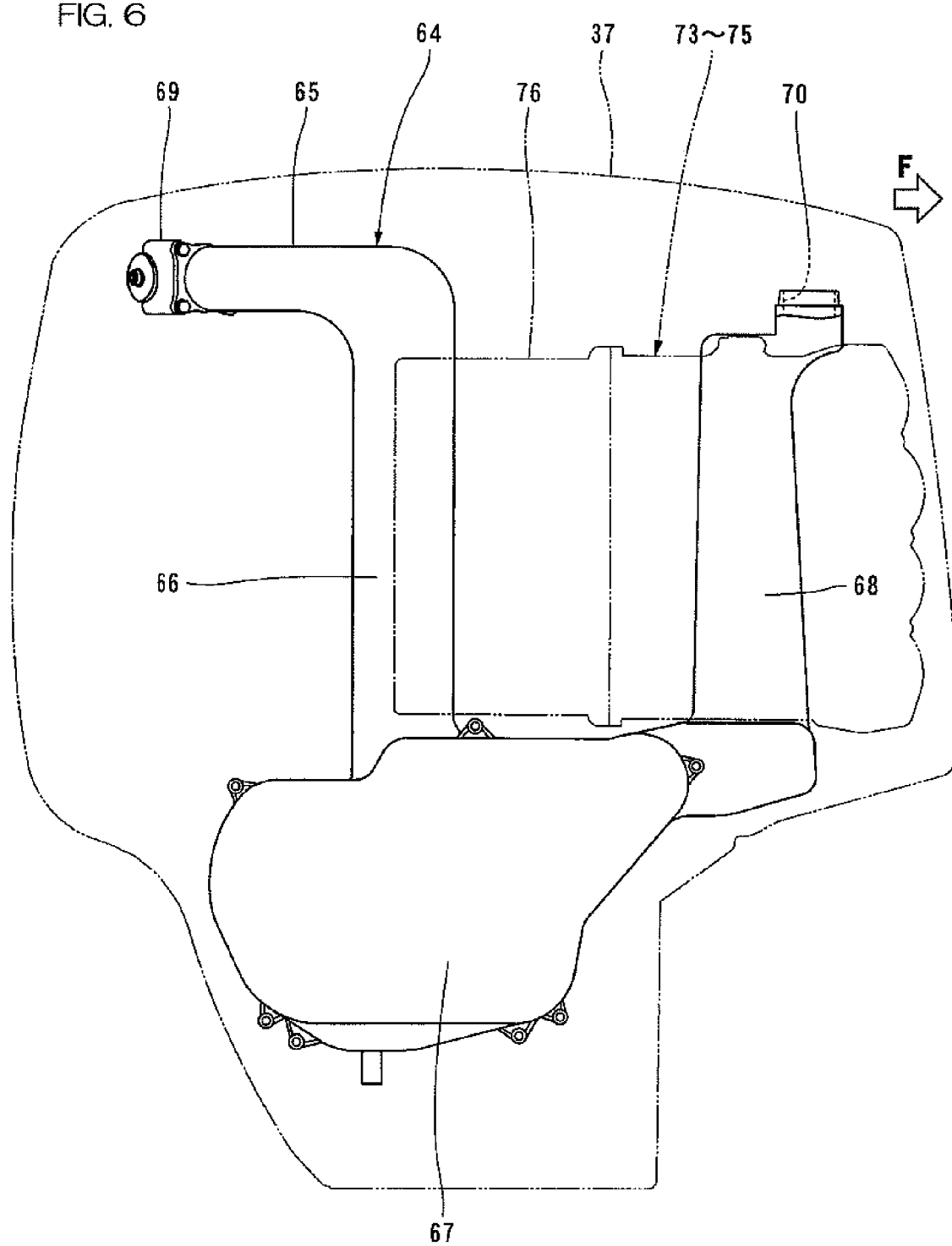
FIG. 6 is a side view of an intake duct.

The outboard motor 31 of this preferred embodiment is to be attached to a transom board of a hull (not shown) so as to be steered and tilted via a bracket 32. Therefore, the outboard motor 31 can be in various postures with respect to the hull in an actual use state; however, in this specification, for the sake of convenience, based on a predetermined reference posture of the outboard motor 31, up-down, left-right, and front-rear directions are defined. The reference posture is a posture of the outboard motor 31 at a steering angle of zero and a tilt angle of zero with respect to the hull in the horizontal posture. In this condition, when a propulsive force in the forward drive direction is generated from the outboard motor 31, the hull moves straight ahead. In other words, in this specification, as expressions of directions of the outboard motor 31 and the respective members, the heading direction of a hull with the outboard motor 31 when it moves ahead, that is, when it moves straight ahead is simply referred to as the front of the outboard motor 31, and the side 180-degree opposite to the front is referred to as the rear side. The left side of the hull with respect to the heading direction of the hull when the hull moves ahead is referred to as the outboard motor left side or the left side simply, the right side of the hull with respect to the heading direction when the hull moves ahead is referred to as the outboard motor right side or the right side, simply. Further, the left-right direction of the outboard motor 31 when the hull moves ahead is referred to as the width direction of the outboard motor 31. FIG. 2 shows the outboard motor 31 viewed from the left side, and FIG. 5 and FIG. 6 show the outboard motor 31 viewed from the outboard motor right side. In these figures, the front of the outboard motor 31 is indicated by an arrow F.

FIG. 2 is a side view of the outboard motor 31 of the first preferred embodiment of the present invention. The outboard motor 31 according to the present preferred embodiment includes an engine support member 33, an engine 2, an upper casing 34, a lower casing 35, a propeller 36, and a engine cover 37. The engine support member 33 is a plate-shaped member joined to the upper end of the bracket 32. On the engine support member 33, the engine 2 is mounted. To the lower portion of the engine support member 33, the upper casing 34 is attached. To the lower end of the upper casing 34, the lower casing 35 is attached. Onto this lower casing 35, the propeller 36 is supported rotatably. The engine cover 37 covers the engine 2. In FIG. 2, etc., the external shape of the engine cover 37 is indicated by a phantom line, and the internal structure is shown.

The engine 2 of this preferred embodiment preferably is a multi-cylinder engine, specifically, a 4-cycle 4-cylinder engine, for example. The engine 2 is mounted on an engine support member 33 while taking a posture in which the axis line of the crankshaft 41 is along the up-down direction. The first cylinder #1 to the fourth cylinder #4 of the engine 2 are positioned behind the crankshaft 41 (on the opposite side of the hull with respect to the crankshaft 41), and are aligned in series along the up-down direction. In this preferred embodiment, among the four cylinders of the engine 2, the cylinder positioned highest is the first cylinder #1, and cylinders below the first cylinder #1 are the second cylinder #2, the third cylinder #3, and the fourth cylinder #4 in order downward. As to the order of ignition of the engine 2, the first cylinder #1, the third cylinder #3, the fourth cylinder #4, and the second cylinder #2 are ignited in this order, for example.

The crankshaft 41 is arranged so as to penetrate through the engine 2 in the up-down direction. To the lower end of the crankshaft 41, a drive shaft 45 is coupled. The drive shaft 45 extends along the up-down direction from the lower end of the engine 2 to the inside of the lower casing 35. The drive shaft 45 is supported rotatably onto the engine support member 33, the upper casing 34 and the lower casing 35 by bearings (not shown). The lower end of the drive shaft 45 is coupled to a propeller shaft 47 via a forward-reverse switching mechanism 46. The propeller 36 is arranged so as to rotate integrally with the propeller shaft 47.

Figure 3:
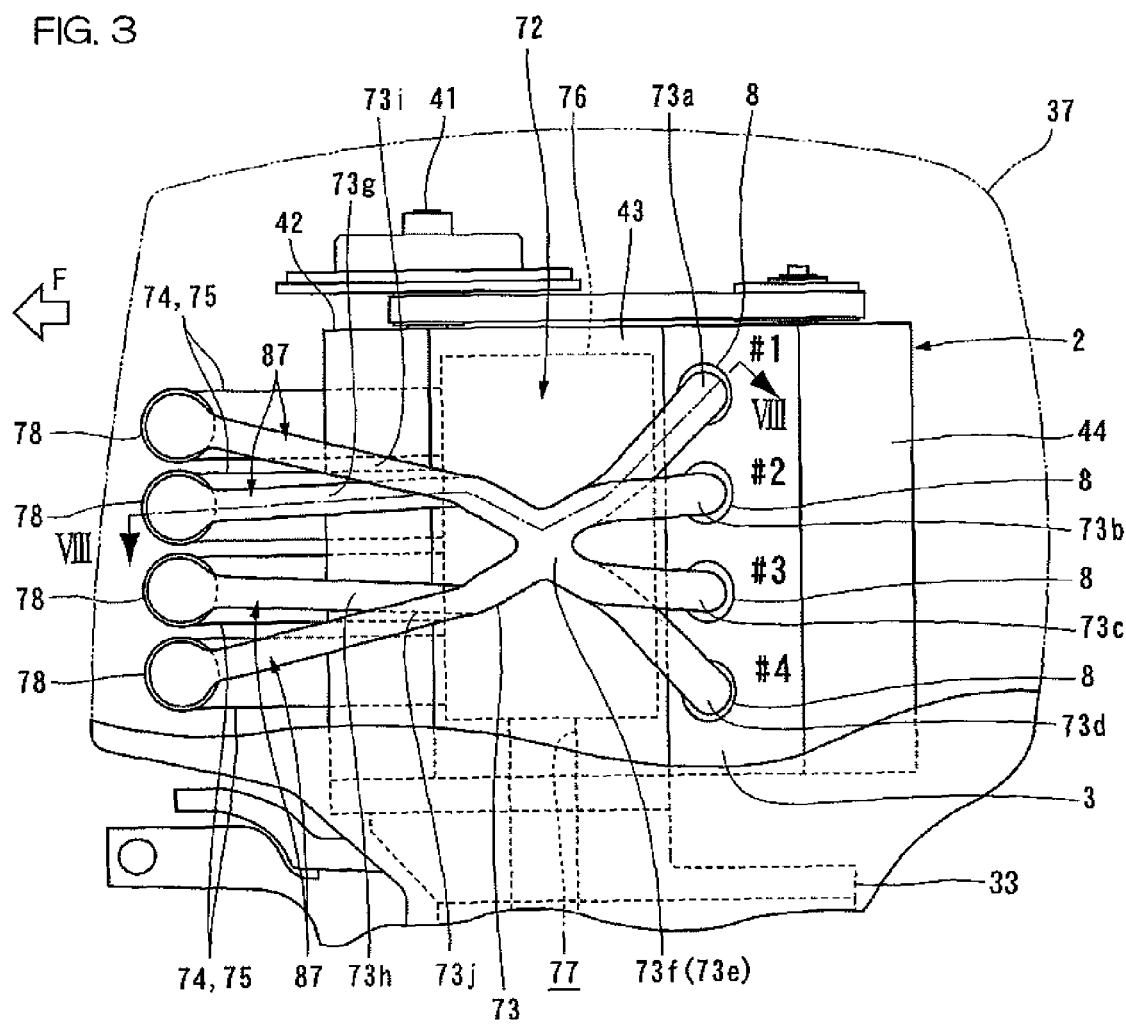
FIG. 3 is an enlarged side view of an engine portion of the outboard motor.
Figure 4:
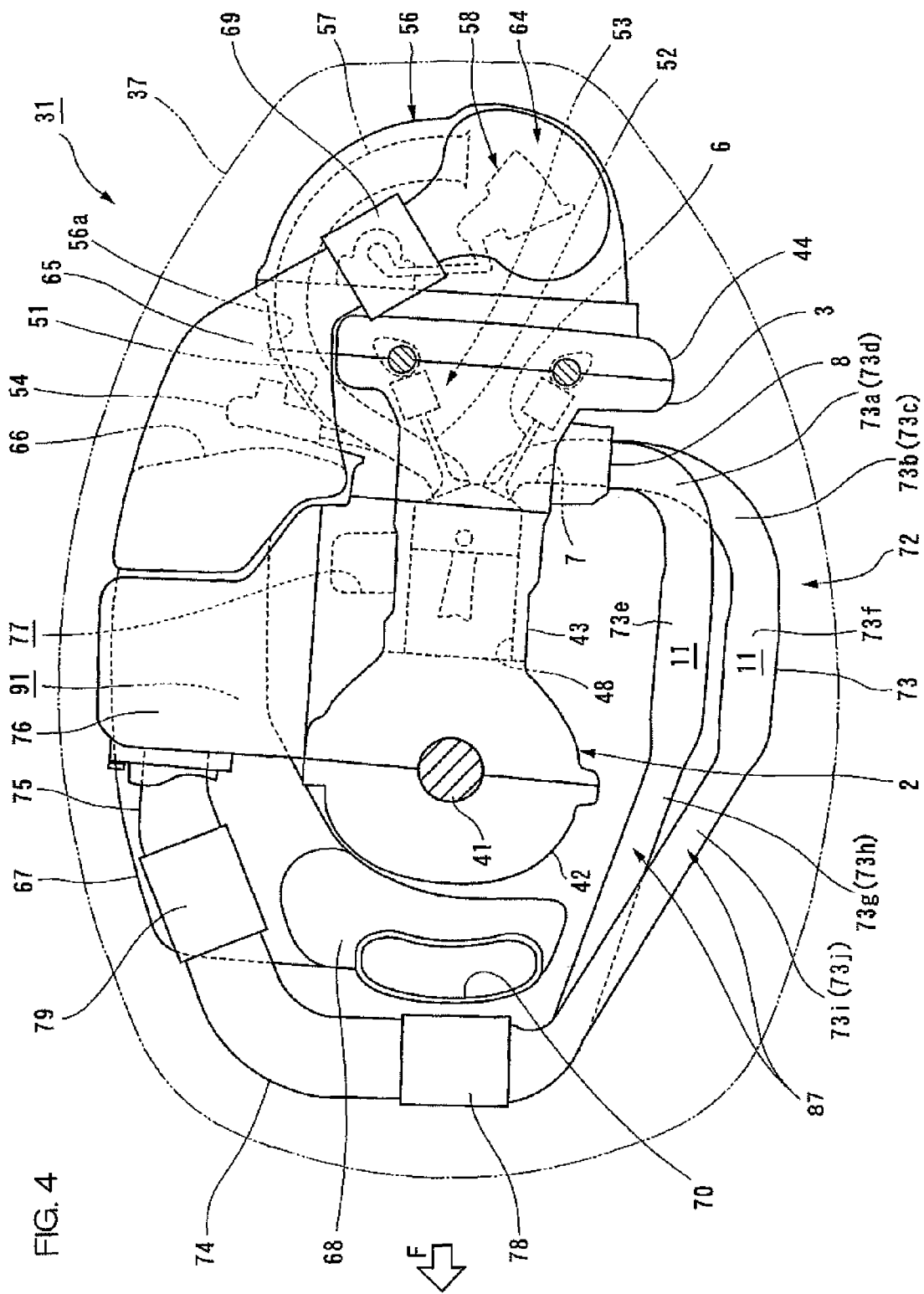
FIG. 4 is an enlarged plan view of the engine portion of the outboard motor.

FIG. 3 is an enlarged side view of the engine portion, and FIG. 4 is an enlarged plan view of the engine portion. The engine 2 includes a crank case 42 that rotatably supports the crankshaft 41, a cylinder body 43, a cylinder head 3, and a head cover 44. The crank case 42 and the cylinder body 43 rotatably support the crankshaft 41. The cylinder head 3 is attached to the cylinder body 43. The head cover 44 is attached to the cylinder body 43. The crank case 42, the cylinder body 43, the cylinder case 3, and the head cover 44 are mounted on the engine support member 33 in a state in which these elements are lined up in this order in the front-rear direction of the outboard motor 31. The crank case 42 is positioned on the forefront side of the outboard motor 1.

In the cylinder body 43, four cylinders 48 (see FIG. 4) constituting first cylinder #1 to fourth cylinder #4 are provided and lined up in the up-down direction.

In the cylinder head 3, as shown in FIG. 4, an intake port 51 and an exhaust port 7 are provided for each of the cylinders. Further, the cylinder head 3 is provided with intake valves 52 and exhaust valves 6 arranged to open and close the ports 51 and 7. The cylinder head 3 is further provided with a valve operating device 53 arranged to drive the intake and exhaust valves 52 and 6 and an injector 54 for each cylinder arranged to inject fuel into the corresponding intake port 51.

The intake ports 51 are provided at the side portion on the outboard motor right side of the cylinder head 3, that is, at the side portion on the opposite side of the exhaust ports 7 in the width direction of the outboard motor 31 as shown in FIG. 4. The intake ports 51 extend toward the outboard motor rear side, that is, toward the head cover 44 side so as to separate from the crank case 42. The respective inlet ends of the intake ports 51 are connected to corresponding intake pipes 57 inside a surge tank 56 arranged behind the head cover 44. The intake surge tank 56 is arranged at the rear end of the engine 2. The rear end of the engine 2 is an end on the opposite side of the crank case 42 in a plan view.

The exhaust ports 7 open on the outer portion (side portion on the outboard motor left side) in the width direction of the outboard motor 31 of the cylinder head 3, and are connected to an exhaust device 72 as shown in FIG. 4. The openings of the exhaust ports 7 define exhaust gas outlets 8. The exhaust gas outlets 8 open toward the left side of the outboard motor 31 on the left side surface of the cylinder head 3. In other words, the exhaust gas outlets 8 are arranged so as to open in the opposite direction of the intake ports 51 in the width direction of the outboard motor 31.

The exhaust device 72 includes a first exhaust pipe 73 whose upstream end is connected to the exhaust gas outlet 8, a second exhaust pipe 74 connected to the downstream end of the first exhaust pipe 73, and a third exhaust pipe 75 connected to the downstream end of the second exhaust pipe 74. The exhaust device 72 further includes an exhaust chamber 76 connected to the downstream end of the third exhaust pipe 75, and a main exhaust passage 77 formed so as to extend downward from the lower end of the exhaust chamber 76. The exhaust device 72 also includes a first catalyst 78 provided in the connecting portion between the first exhaust pipe 73 and the second exhaust pipe 74, and a second catalyst 79 provided in the connecting portion between the second exhaust pipe 74 and the third exhaust pipe 75. In this preferred embodiment, the space formed inside the first to third exhaust pipes to 75 defines the exhaust passage 11.

FIG. 5 is a sectional view for describing a configuration relating to the intake surge tank 31. The inlet ends of the intake ports 51 open on the end on the outboard motor right side of the rear surface 3*a* of the cylinder head 3 (rear surface to which the head cover is connected). The openings of the inlet ends of the intake ports define intake inlets 55 of the engine 2. The intake inlets 55 are arranged on the opposite side of the exhaust gas outlets 8 of the cylinder head 3 in the width direction of the outboard motor 31. The intake inlets 55 are connected to respective intake holes 56*a* of the intake surge tank 56 attached to the rear surface 3*a* of the cylinder head 3. The intake holes 56*a* are connected to the respective intake pipes inside the intake surge tank 56.

The intake surge tank 56 has a box-shaped intake surge tank main body 56*b* opening toward the front of the outboard motor 56 (head cover 44 side), and an attaching member 56*c* which closes the opening portion of the intake surge tank main body 56*b*. The intake surge tank 56 is attached to the head cover 44 preferably via attaching bolts 56*d*, for example.

The intake pipes 57 are arranged so as to extend while curving in an arc shape in a plan view. In detail, the intake pipes 57 curve so as to project to the rear side (upper side in FIG. 5) of the outboard motor 56, that is, in the opposite direction of the crank case 42 with respect to the cylinder head 3 from the intake inlets 55. The intake pipes 57 curve so as to project to the left side (right side in FIG. 5) of the outboard motor 31, that is, come closer to the exhaust ports 7 in the width direction of the outboard motor 31. The intake pipes 57 are arranged so as to extend across the region from the side wall 56*e* on the outboard motor right side to the rear wall 56*f* of the suction surge tank main body 56*b*. The intake pipes 57 open at positions on the outboard motor rear side inside the intake surge tank 56.

The intake hole 56*a* and the intake pipe 57 are provided for each cylinder, and define an intake passage for each cylinder in cooperation with the intake port 51 of each cylinder. The inlet ends of the intake pipes 57 define an intake ports for intake to the engine 2. Intake passages are arranged so as to extend to the head cover 44 side, so that the length of the intake passages can be secured while the exhaust passage 11 is formed to be long.

At the inlet ends of the intake pipes 57, a variable intake pipe mechanism 58 is provided. The variable intake pipe mechanism 58 includes auxiliary intake pipes 59 removably connected to the intake pipes 57, and servo motors 61 which drives the auxiliary intake pipes 59. The auxiliary intake pipe 59 is provided for each intake pipe 57 of each cylinder. These auxiliary intake pipes 59 are pivotally supported on a support bracket 62 of the head cover 44 such that they move between the connecting position shown by the solid line in FIG. 5 and the separated position shown by the alternate long and two short dashed line in FIG. 5.

Figure 7:
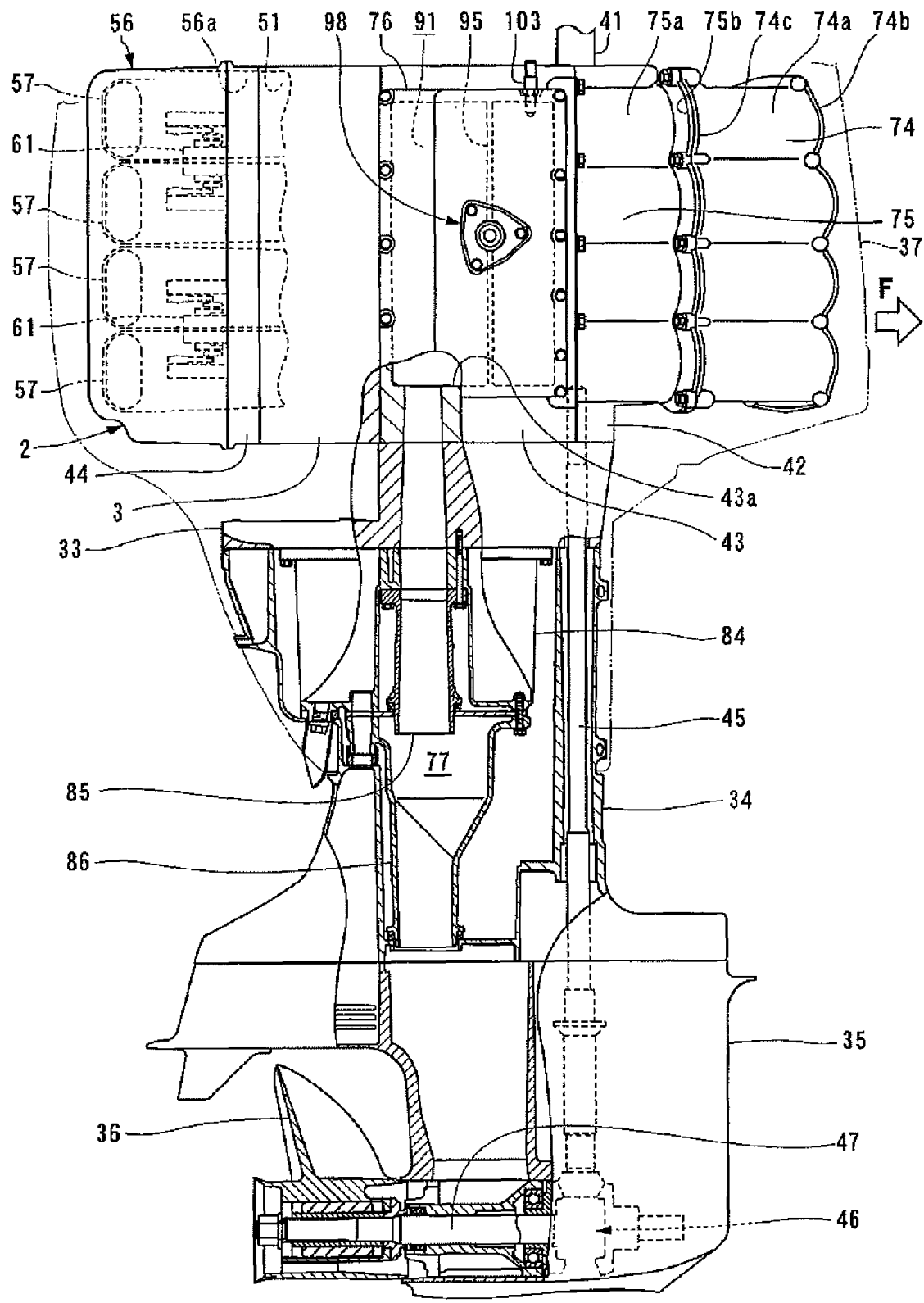
FIG. 7 is a sectional view for describing a configuration of an exhaust system.

These auxiliary intake pipes 59 are joined to the servo motors 61 via links 63, and are driven to turn by the servo motors 61 to be arranged to the connecting position or the separated position. By disposing the auxiliary intake pipes 59 at the connecting position, the substantial intake pipe length becomes relatively long. By moving the auxiliary intake pipes 59 to the separated position, the substantial intake pipe length becomes relatively short. The servo motors 61 are provided at the upper portion and the lower portion of the head cover 44, respectively, as shown in FIG. 7. The servo motor 61 positioned on the upper side drives the first cylinder auxiliary intake pipe 59 and the second cylinder auxiliary intake pipe 59, and the servo motor 61 positioned on the lower side drives the third cylinder auxiliary intake pipe 59 and the fourth cylinder auxiliary intake pipe 59.

To the upper end of the intake surge tank 56, as shown in FIG. 4, an intake duct 64 arranged to lead air of the inside the engine cover 37 is connected. The intake duct 64 leads the air inside the engine cover 37 to the intake port of the engine 2 (the inlet end of the intake pipes 57 opening inside the intake surge tank 56).

The intake duct 64 preferably has a U shape as viewed from the outboard motor right side as shown in the side view of FIG. 6. In other words, the intake duct 64 has a downstream side horizontal portion 65 which has a downstream side end connected to the upper end of the intake surge tank 56 and extends in the front-rear direction at the upper right rear of the engine 2. Further, the intake duct 64 has a downstream side vertical portion 66 which extends downward to the vicinity of the lower end of the engine 2 on the lateral right side of the engine 2 from the front end of the downstream side horizontal portion 65. Further, the intake duct 64 has an upstream side horizontal portion 67 which extends forward from the lower end of the downstream side vertical portion 66. Further, the intake duct 64 has an upstream side vertical portion 68 extending upward to the height of the vicinity of the upper end of the engine 2 from the front end of the upstream side horizontal portion 67. The downstream side horizontal portion 65 is provided with a throttle valve 69 (also see FIG. 4).

At the upper end of the upstream side vertical portion 68, an air suction port 70 opening inside the engine cover 37 is provided. The space inside the engine cover 37 communicates with the atmosphere via the air inlet 71 provided at the rear portion of the outboard motor left side of the engine cover 37 as shown in FIG. 2. The air introduced into the engine cover 37 from the air inlet 71 is suctioned into intake passages of the respective cylinders through the intake duct 64 and the intake surge tank 56.

FIG. 7 is a sectional view for describing a configuration of an exhaust system. The main exhaust passage 77 opens inside water at the shaft center of the propeller 36. The main exhaust passage 77 preferably includes a plurality of members. Specifically, the plurality of members of the main exhaust passage 77 include a cylinder body 43, an engine support member 33, an oil pan 84 attached to the lower end of the engine support member 33, and a pipe 85 attached to the oil pan 84. Further, the plurality of members of the main exhaust passage 77 include a muffler 86 which is attached to the lower end of the oil pan 84 and extends downward, the upper casing 34 which houses the muffler 86, and the lower casing 35.

The first to third exhaust pipes 73 to 75 shown in FIG. 2 to FIG. 4 are drawn such that only the external form or contour of the exhaust passage 11 formed inside the first to third exhaust pipes is shown. These first to third exhaust pipes 73 to 75 are preferably molded by casting into a pipe shape in actuality.

Figure 8:
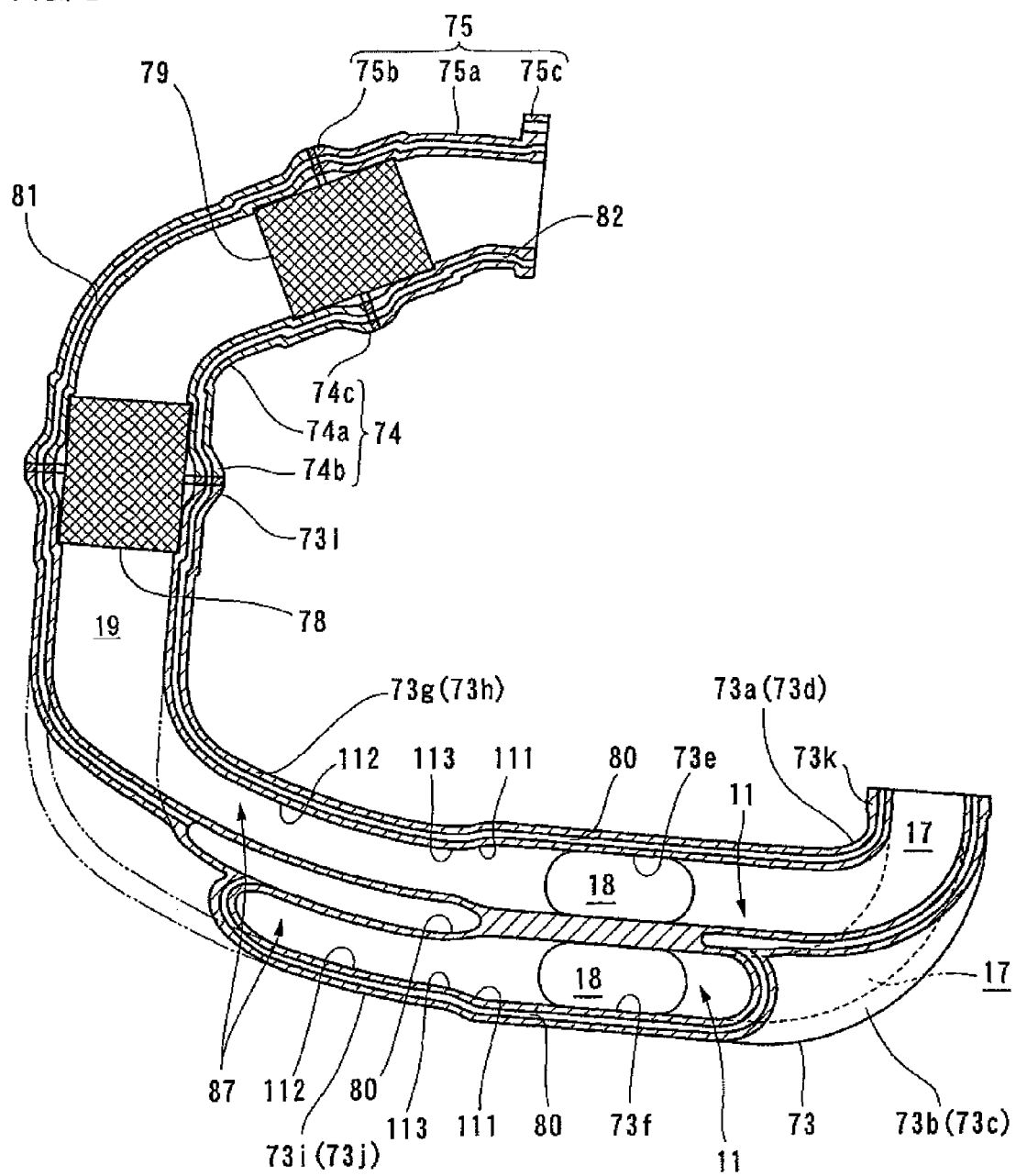
FIG. 8 is a sectional view of an exhaust pipe, along VIII-VIII of FIG. 3.

As shown in the sectional view of FIG. 8, the first exhaust pipe 73 preferably has a double pipe structure in which the exhaust passage 11 is covered by a coolant passage 80. The second and third exhaust pipes 74 and 75 are also preferably molded by casting into a pipe shape, and have the same double pipe structure as that of the first exhaust pipe 73. The coolant passage 80 formed inside the first exhaust pipe 73 communicates with a coolant passage (not shown) of the cylinder head 3. The coolant passage 80 is connected to the coolant passage 83 (see FIG. 9) inside the exhaust chamber 76 via the coolant passages 81 and 82 inside the second exhaust pipe 74 and the third exhaust pipe 75.

The first and second catalysts 78 and 79 preferably are made of a so-called ternary catalyst. The ternary catalyst can simultaneously detoxify hydrocarbon, nitrogen oxide, and carbon monoxide at the time of combustion near a theoretical air-fuel ratio. The first catalyst 78 is arranged on the opposite side of the crank case 42 across the air suction port 70 of the intake duct 64 as shown in FIG. 4. In other words, the first catalyst 78 is arranged on the further front of the outboard motor 31 than the air suction port 70 in a plan view.

The first exhaust pipe 73 preferably has a structure obtained by substantially combining two exhaust pipes 12 shown in FIG. 1, that is, exhaust pipes 12 connected to two cylinders whose exhaust valves 6 open in different time periods. One of the two exhaust pipes of the first exhaust pipe 73 corresponds to the first cylinder #1 and the fourth cylinder #2 whose ignition timings are 360 degrees different from each other. In detail, this exhaust pipe has, as shown in FIG. 3, FIG. 4, and FIG. 8, a first cylinder upstream portion 73*a* and a fourth cylinder upstream portion 73*d*, and a first collecting portion 73*e* (see FIG. 3 and FIG. 8) which connects the downstream ends of these upstream portions 73*a* and 73*d* to each other. This exhaust pipe further has first and second downstream portions 73*g* and 73*h* branched from the first collecting portion 73*e*.

The other of the two exhaust pipes of the first exhaust pipe 73 corresponds to the second cylinder #2 and the third cylinder #3 whose ignition timings are 360 degrees different from each other. In detail, this exhaust pipe includes, as shown in FIG. 3, FIG. 4, and FIG. 8, a second cylinder upstream portion 73*b* and a third cylinder upstream portion 73*c*, and a second collecting portion 73*f* which connect the downstream ends of these upstream portions 73*b* and 73*c*. This exhaust pipe further has third and fourth downstream portions 73*i*; and 73*j* branched from the second collecting portion 73*f*.

At the inlet ends of the first to fourth upstream portions 73*a* to 73*d*, as shown in FIG. 8, an upstream side attaching flange 73*k* arranged to attach the first exhaust pipe 73 to the cylinder head 3 is integrally provided. The inlet ends of the first to fourth upstream portions 73*a* to 73*d* are connected to each other by the upstream side attaching flange 73*k*.

At the outlet ends of the first to fourth downstream portions 73*g* to 73*i*, a downstream side attaching flange 73*l* arranged to attach the second exhaust pipe 74 is integrally provided. The outlet ends of the first to fourth downstream portions 73*g* to 73*i* are connected to each other by the downstream side attaching flange 73*l*.

The spaces formed inside the first cylinder upstream portion 73*a* to the fourth cylinder upstream portion 73*d* define the upstream portions 17 of the exhaust passages 11. The spaces formed inside the first collecting portion 73*e* and the second collecting portion 73*f* define the collecting portions 18 of the exhaust passages 11. Further, the spaces formed inside the first downstream portion 73*g* to the fourth downstream portion 73*i* and the space formed inside the second exhaust pipe 74 and the third exhaust pipe 75 define the downstream portions 19 of the exhaust passages 11.

The first and fourth cylinder upstream portions 73*a* and 73*d* are arranged closer to the engine 2 in the width direction of the outboard motor 31 than the second and third cylinder upstream portions 73*b* and 73*c* as shown in FIG. 4 and FIG. 8. Therefore, the first collecting portion 73*e* is provided at a position closer to the engine 2 than the second collecting portion 73*f*.

These first collecting portion 73*e* and second collecting portion 73*f* are arranged at substantially the same height as that of the central portion in the up-down direction of the cylinder body 43 as shown in FIG. 3. Accordingly, the pipe length of the first cylinder upstream portion 73*a* and the pipe length of the fourth cylinder upstream portion 73*d* can be made equal to each other. The pipe length of the second cylinder upstream portion 73*b* and the pipe length of the third cylinder upstream portion 73*c* can be made equal to each other.

Further, the first cylinder upstream portion 73*a* and the fourth cylinder upstream portion 73*d* are preferably longer than the second cylinder upstream portion 73*b* and the third cylinder upstream portion 73*c* in the side view of FIG. 3. On the other hand, as shown in FIG. 4, the second cylinder upstream portion 73*b* and the third cylinder upstream portion 73*c* are preferably constructed such that the radius of curvature of the bent portion for connection to the cylinder head 3 is larger than the radius of curvature of the first and fourth cylinder upstream portions 73*a* and 73*d*. With this configuration, the first cylinder and fourth cylinder upstream portions 73*a* and 73*d* and the second cylinder and third cylinder upstream portions 73*b* and 73*c* are preferably constructed such that their pipe lengths match each other.

The first and second downstream portions 73*g* and 73*h* connected to the first collecting portion 73*e* extend upward and downward, respectively, as they go to the downstream side (the front of the outboard motor 31, the crank case 42 side in the side view of FIG. 3) from the first collecting portion 73*e* as shown in FIG. 3. These first and second downstream portions 73*g* and 73*h* bend toward the front of the outboard motor 31 at positions corresponding to the connecting portion between the crank case 42 and the cylinder body 43 as viewed laterally. The inclination angles of the parts 73*g* and 73*h* with respect to the horizontal become smaller at those positions. A portion on the tip side of the bent portion of the first downstream portion 73g, which is positioned higher than the second downstream portion 73h, inclines forward and downward, and extends straight in a side view. A portion on the tip side of the bent portion of second downstream portion 73h positioned lower inclines forward and upward, and extends straight in a side view.

The third and fourth downstream portions 73i and 73j connected to the second collecting portion 73f extend upward and downward, respectively, as they go to toward the downstream side (forward) from the second collecting portion 73f as shown in FIG. 3. These third and fourth downstream portions 73i and 73j bend such that their inclination angles with respect to the horizontal become smaller than those of the upstream sides at a position corresponding to the connecting portion between the crank case 42 and the cylinder body 43 as viewed laterally. The inclination angles with respect to the horizontal of the portions on the tip sides of the bent portions of these downstream portions are larger than the inclination angles of the first and second downstream portions 73g and 73h with respect to the horizontal. A portion on the tip side of the bent portion of the third downstream portion 73i, which is positioned higher than the fourth downstream portion 73j, inclines forward and upward, and extends straight in the side view. The portion on the tip side of the bent portion of the fourth downstream portion 73j positioned lower inclines forward and downward, and extends straight in the side view.

The outlet end of the third downstream portion 73i is positioned above the outlet end of the first downstream portion 73g. The outlet end of the fourth downstream portion 73j is positioned below the outlet end of the second downstream portion 73h.

The outlet ends of the first to fourth downstream portions 73g to 73k bend toward the center in the width direction of the outboard motor 31 as shown in FIG. 4. In the portions assuming straight shapes in the side view of these first to fourth downstream portions 73g to 73j, supersonic nozzles 87 described later are preferably provided, respectively.

The second exhaust pipe 74 is connected to the first exhaust pipe 73 ahead of the crank case 42, that is, on the opposite side of the cylinder head 3 with respect to the crank case 42 as shown in FIG. 4. The second exhaust pipe 74 is arranged so as to extend to the diagonally right front of the engine 2. This second exhaust pipe 74 is preferably formed by integrally molding by casting the four tubular portions 74a and flanges 74b and 74c positioned on the upstream side ends and the downstream side ends of these tubular portions 74a as shown in FIG. 7 and FIG. 8.

The third exhaust pipe 75 is arranged on the lateral right side of the engine 2, that is, at a position adjacent aside the crank case 42 as shown in FIG. 4. The third exhaust pipe 75 extends in the front-rear direction of the outboard motor 31, that is, a direction in which the crank case 42 and the cylinder body 43 are lined up. The third exhaust pipe 75 connects the second exhaust pipe 74 to the exhaust chamber 76. The exhaust chamber 76 is positioned on the lateral right side of the cylinder body 43, that is, on the opposite side of the first exhaust pipe 73 in the width direction of the outboard motor 31. This third exhaust pipe 75 is preferably formed by integrally molding by casting the four tubular portions 75a and flanges 75b and 75c positioned on the inlet ends and the outlet ends of these tubular portions 75a as shown in FIG. 7 and FIG. 8.

These first to third exhaust pipes 73 to 75 extend from the exhaust gas outlets 8 in a plan view as shown in FIG. 4. Further, the first to third exhaust pipes 73 to 75 define a bypass exhaust pipe which extends along the crank case 12 in the vicinity of the outside (vicinity of the front) of the crank case 42, and bypasses the engine 4 and extends to the opposite side in the width direction of the outboard motor 31 (right side of the outboard motor 31). Preferably, the length of the first to third exhaust pipes 73 to 75 (the bypass exhaust pipe) is designed so as to surround the crankshaft 41 at angles not less than 90 degrees in the rotation direction of the crankshaft 41, for example.

The exhaust passage 11 inside the first to third exhaust pipes 73 to 75 and the intake passage on the downstream side of the intake surge tank 56 are preferably formed into a substantially S shape in a plan view as shown in FIG. 4. The intake passage on the downstream side of the intake surge tank 56 means an intake passage formed inside the intake pipe 57, the intake hole 56a, and the intake port 51. Of course, the first to third exhaust pipes 73 to 75 and the intake passage may be formed into a mirror-reversed S shape in a plan view (that is, an S shape in a bottom view). This mirror-reversed S shape is also included in one mode of "S shape." In other words, the first to third exhaust pipes 73 to 75 and the intake passage extend opposite to each other in the width direction of the outboard motor from the cylinder head 14. The intake passage curves so as to bypass the cylinder head at the rear portion of the outboard motor. On the other hand, the bypass exhaust pipe formed of the first to third exhaust pipes 73 to 75 curves so as to bypass the engine 4 to the front of the crank case 12 at the front portion of the outboard motor.

The supersonic nozzle 87 provided on the first exhaust pipe 73 is arranged to accelerate the flow rate of the exhaust gas from a speed not more than the sonic speed to a supersonic speed. This supersonic nozzle 87 may be a De Laval nozzle invented by De Laval. A De Laval nozzle has a flow passage structure in which a sectional area of a flow path is first reduced and then increased.

The supersonic nozzle 87 has, as shown in FIG. 8, a narrowing portion 111, an expanding portion 112, and a throat portion 113. The narrowing portion 111 is formed such that the passage cross-section area is gradually reduced toward the downstream side of the flow direction of the exhaust gas. The expanding portion 112 is formed such that the passage cross-section area gradually increases toward the downstream side. The throat portion 113 is positioned between the narrowing portion 111 and the expanding portion 112, and has the smallest passage cross-section area among these elements.

The downstream side end of the first exhaust pipe 73 bends toward the center in the width direction of the outboard motor 1, that is, toward the first catalyst 78. The inner diameter at the downstream side end of the first exhaust pipe 73, that is, the inner diameter of the portion on the downstream side of the expanding portion 112 gradually increases toward the downstream side. Accordingly, the exhaust pipe inner surface can be connected to the first catalyst 78 with a relatively large outer diameter without steps.

The inner diameter at the upstream end of the narrowing portion 111 matches the inner diameter of the first and second collecting portions 73e and 73f of the first exhaust pipe 73. The inner diameter at the downstream end of the expanding portion 112 matches the inner diameter of the downstream portion 73g to 73j of the first exhaust pipe 73.

Figure 9:
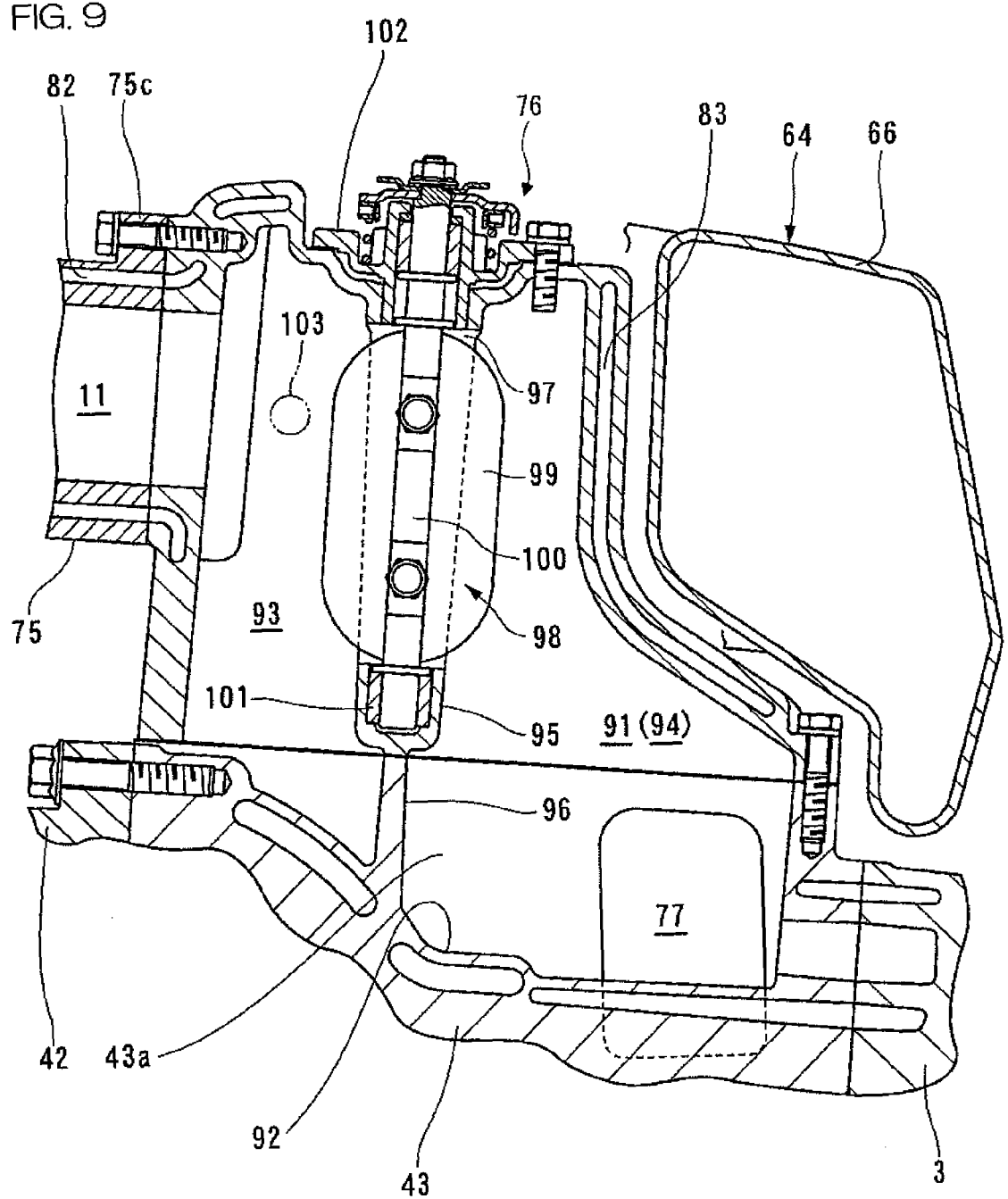
FIG. 9 is a sectional view of an exhaust chamber.

FIG. 9 is a sectional view of the exhaust chamber 76. The exhaust chamber 76 preferably has a box shape which opens to the cylinder body 43. The exhaust chamber 76 is attached to the side portion on the outboard motor right side of the cylinder body 43 such that the opening portion of the exhaust chamber is closed by the cylinder body 43. On the side portion of the cylinder body 43, a recess portion 92 which opens to the exhaust chamber 76 (to the right side of the outboard motor 31) is formed. The recess portion 92 defines an expansion chamber 91 in conjunction with the exhaust chamber 76. Accordingly, the expansion chamber 91 has a capacity larger than the inner space of the exhaust chamber 76. On the lower wall 43a of the cylinder body 43 which defines the side wall on the lower side of the recess portion 92, as shown in FIG. 7 and FIG. 9, the main exhaust passage 77 opens.

Near the lower side of the exhaust chamber 76, as shown in FIG. 6, the upstream side horizontal portion 67 of the intake duct 64 is positioned. On the opposite side (near the rear side) of the third exhaust pipe 75 of the exhaust chamber 76, as shown in FIG. 9, the downstream side vertical portion 66 of the intake duct 64 is positioned.

The exhaust chamber 76 preferably has a height in the up-down direction that is longer than the width in the front-rear direction to allow the four third exhaust pipes 75 to be connected thereto (see FIG. 7).

Inside the outer wall of the exhaust chamber 76, as shown in FIG. 9, a coolant passage 83 is formed. The coolant passage 83 is arranged such that a coolant is supplied from the coolant passage 82 of the third exhaust pipe 75, and this coolant is discharged to a coolant discharge passage (not shown) of the cylinder body 43.

Inside the exhaust chamber 76, a partition 95 for partitioning the expansion chamber 91 into an upstream exhaust gas chamber 93 and a downstream exhaust gas chamber 94 is provided. This partition 95 partitions the expansion chamber 91 into the above-described two chambers 93 and 94 in cooperation with a longitudinal wall 96 extending from the cylinder body 43. In the partition 95, a communicating hole 97 is formed so as to make communication between both the gas chambers 93 and 94. Further, the partition 95 is provided with an on-off valve 98 which opens and closes the communicating hole 97. The communicating hole 97 is positioned at the central portion in the up-down direction of the partition 95 and also at the central portion of the partition 95 in the width direction of the outboard motor 31. The opening shape of the communicating hole 97 preferably is ellipse shape that allows the valve body 99 of the on-off valve 98 to be inserted therein.

The on-off valve 98 preferably is a butterfly valve having a disk-shaped valve body 99 inserted inside the communicating hole 97. The valve body 99 preferably includes an oval plate long in the width direction of the partition 95. This valve body 99 is attached to a valve shaft 100 extending along the partition 95. The valve shaft 100 is pivotally supported by a bearing 101 and a cover 102 fixed to the partition 95. The valve shaft 100 is connected to a drive device not shown via a wire, and rotates according to driving of the drive device.

The on-off valve 98 is driven by the drive device so as to close when the crankshaft 41 rotates in reverse or a high negative pressure is generated in the exhaust chamber 76, and opens in other cases. A sensor (not shown) for detecting the rotating speed of the crankshaft 41 detects whether the crankshaft 41 has rotated in reverse. The pressure inside the exhaust chamber 76 is detected by a pressure sensor not shown.

At the upper end of the exhaust chamber 76, as shown in FIG. 7, an oxygen sensor 103 is provided to detect the amount of oxygen in the exhaust gas. The oxygen sensor 103 is located at the upper end of the upstream exhaust gas chamber 93, and transmits detection data indicative of the amount of oxygen in the exhaust gas flowing in the upstream exhaust gas chamber 93 to an ECU (Electronic Control Unit, not shown) of the engine 2. The ECU controls the fuel injection amount of the injector 54 and the ignition timing of the ignition plug (not shown), etc., based on the speed of the engine 2, the opening degree of the throttle valve 69, and the amount of oxygen in the exhaust gas detected by the oxygen sensor 103, etc.

The exhaust gases in the cylinders of the engine 2 respectively flow into the exhaust chamber 76 through the first to third exhaust pipes 73 to 75 and join together inside the exhaust chamber 76, and are then discharged to the upstream side end of the main exhaust passage 77. The exhaust gas led into the main exhaust passage 77 is discharged into water through the insides of the lower casing 35 and the propeller 36 from the inside of the upper casing 34.

Figure 10:
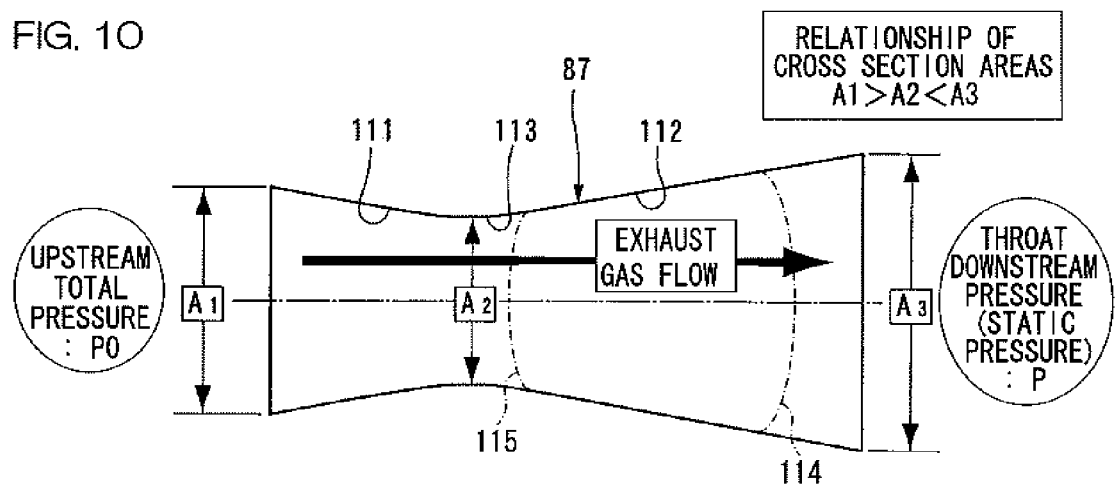
FIG. 10 is a view showing a configuration of a supersonic nozzle.

FIG. 10 is a view for describing in detail the flow channel structure of the supersonic nozzle 87. The cross-section area at the upstream end of the narrowing portion 111 (right end in FIG. 10) is referred to as "upstream cross-section area A1," and the cross-section area at the expanding portion 112 (left end in FIG. 10) of the downstream portion is referred to as "downstream side cross-section area A3." In addition, the cross-section area of the throat portion 113 is referred to as "throat cross-section area A2." These satisfy the relationship of A1>A2<A3. In other words, the upstream cross-section area A1 and the downstream cross-section area A3 are larger than the throat cross-section area A2.

The narrowing portion 111, the expanding portion 112, and the throat portion 113 are formed such that their sectional shapes (shapes as viewed from the upstream side of the exhaust passage 11) preferably are circular or substantially circular.

In this preferred embodiment, the narrowing portion 111 and the expanding portion 112 preferably have a tapered pipe shape whose rate of change in cross-section area is fixed, that is, whose cross-section area changes linearly. However, the supersonic nozzle 87 to be used in the exhaust device 72 according to a preferred embodiment is not limited to this shape, and may be shaped so that the rate of change in cross-section area gradually changes.

The supersonic nozzle 87 is preferably formed so as to satisfy the conditions shown in the following mathematical formulas (1) and (2). Accordingly, when the flow rate of the exhaust gas flowing into the throat portion 113 reaches mach 1 (sonic speed), in the expanding portion 112, the exhaust gas can be accelerated to a higher speed.

$$\frac{dM}{dx} = \frac{\Lambda}{1 - M^2} \quad (1)$$

$$\Lambda \equiv M \left[ 1 + \frac{\gamma - 1}{2} M^2 \right] \left[ \frac{\gamma M^2}{2} \left( \frac{4f}{D} \right) - \frac{1}{A} \frac{dA}{dx} \right] \quad (2)$$

The mathematical formula (1) shows the relationship between the shape of the exhaust pipe and the mach number in a primary flow with viscous friction. The mathematical formula (2) defines $\Lambda$ in the mathematical formula (1).

In these mathematical formulas, M denotes a mach number, A denotes the flow channel cross-section area at an arbitrary cross-section of the exhaust pipe, D denotes a pipe corresponding diameter at the arbitrary cross-section, $\gamma$ denotes a specific heat ratio, x denotes the distance (position) in the flow direction, and f denotes a friction coefficient.

Figure 11:
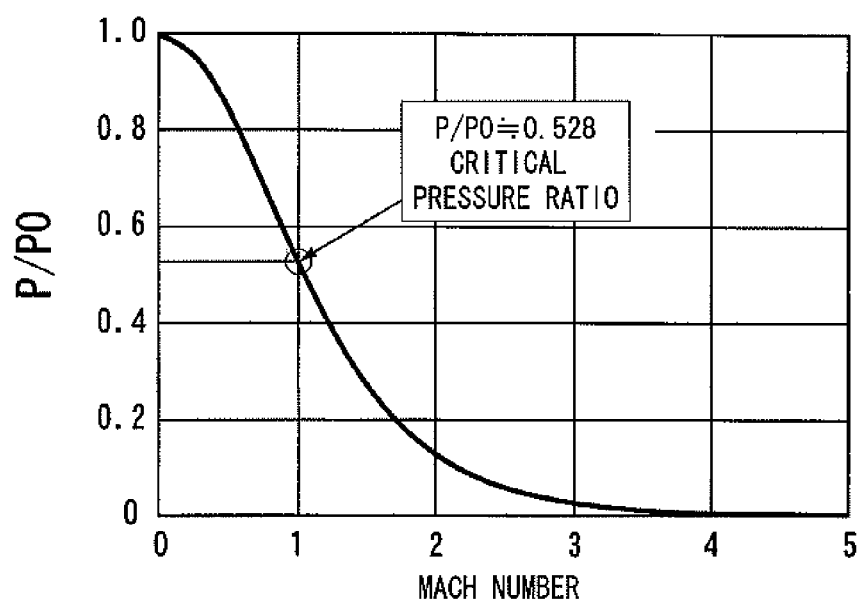
FIG. 11 is a graph showing the relationship between the pressure ratio of the upstream and the downstream of the supersonic nozzle and the Mach number.

FIG. 11 is a view showing the relationship of the mach number with the ratio (P/P0) of the total pressure (P0) of the upstream of the inlet of the supersonic nozzle 87 and the static pressure (P) of the downstream of the throat portion 113. As is understood from this figure, the mach number reaches "1" under a condition that the pressure ratio (P/P0) is smaller than the critical pressure ratio of about 0.528. In other words, according to a rise in the upstream total pressure (P0) to make the ratio (P/P0) smaller than the critical pressure ratio of about 0.528, the flow rate of the exhaust gas is accelerated when passing through the narrowing portion 111 and the flow rate of the exhaust gas flowing into the throat portion 74 reaches the sonic speed.

When the flow rate of the exhaust gas flowing into the throat portion 113 thus reaches the sonic speed, a shock wave 114 is generated inside the supersonic nozzle 87. This shock wave 114 is accelerated when passing through the expanding portion 112 of the supersonic nozzle 87. When the shock wave 114 is thus generated, inside the throat portion 113, a shock wave 114 and an expansion wave 115 composed of a pressure wave advancing opposite to the shock wave 114 are generated.

While the shock wave 114 is accelerated in the expanding portion 112 of the supersonic nozzle 87, the expansion wave 115 advances opposite to the shock wave 114. Accordingly, an excessive negative pressure is generated between the shock wave 114 and the expansion wave 115. As a result, the temperature of the exhaust gas between the shock wave 114 and the expansion wave 115 lowers.

The shock wave 114 and the expansion wave 115 propagate inside the first exhaust pipe 73 positioned on the upstream side of the first catalyst 78. Therefore, a negative pressure is generated inside the first exhaust pipe 73, and the exhaust gas is easily discharged from the exhaust port 7 into the exhaust passage 11 in the exhaust stroke of the engine 2. In addition, the temperature of the exhaust gas in the first exhaust pipe 73 lowers.

In the exhaust device 72 according to this preferred embodiment, as shown in FIG. 12A to FIG. 12C, a shock wave 114 propagating in the exhaust passage 11 and the first to fourth upstream portions 73a to 73d are used during the exhaust stroke. Accordingly, a condition for making the flow rate of the exhaust gas reach the sonic speed in the supersonic nozzle 87, that is, the condition that the pressure ratio (P/P0) becomes smaller than the critical pressure ratio of about 0.528 is easily satisfied.

In the cylinder #A, when the exhaust valve 6 opens during the exhaust stroke, a combustion gas with a high pressure jets out into the exhaust port 7 from the combustion chamber. The flow rate of the combustion gas (exhaust gas 116) jetting out into the exhaust port 7 increases according to the opening degree of the exhaust valve 6, and reaches the sonic speed before the exhaust valve 6 becomes its full-open state. When the flow rate of the exhaust gas 116 thus reaches the sonic speed, a supersonic shock wave 114 is generated inside the exhaust port 7. At this time, as shown in FIG. 12A, the shock wave 114 advances from the inside of the exhaust port 7 into the first exhaust pipe 73, that is, inside the upstream portion 17 of the exhaust passage 11, and further propagates at a high speed toward the downstream. On the other hand, the exhaust gas 116 advances to the downstream side at a relatively low speed inside the upstream portions 17 behind the shock wave 114.

The shock wave 114 advancing in the first exhaust pipe 73 is branched into the downstream portion 19 and the upstream portion 17 on the cylinder #B side (hereinafter, referred to as "branched passage 117") as shown in FIG. 12B when it passes through the collecting portion 18, and advances inside the downstream portion 19 and the branched passage 117 independently. The shock wave 114 advancing in the downstream portion 19 passes through the supersonic nozzle 87 and then attenuates and disappears. On the other hand, the shock wave 114 advancing inside the branched passage 117 is reflected by the exhaust valve 6 (closed state) of the cylinder #B, and reverses inside the branched passage 117, and returns to the collecting portion 18.

The branched passage 117 is designed such that the timing at which the shock wave 114 returns to the collecting portion 18 from the branched passage 117 and the timing at which the exhaust gas 116 with a high pressure discharged from the cylinder #A and advancing behind the shock wave inside the upstream portion 17 reaches the collecting portion 18 coincide with each other. Accordingly, as shown in FIG. 12C, the shock wave 114 which has propagated inside the exhaust passage 11 on the cylinder #A side from the branched passage 117 and the exhaust gas 116 with a high pressure inside this exhaust passage 11 collide with each other. In other words, the cross-section area and length of the branched passage 117 are dimensionally set such that the shock wave 114 and the exhaust gas 116 thus collide with each other.

Due to the collision between the shock wave 114 and the exhaust gas 116, the total pressure (P0) of the upstream of the inlet of the supersonic nozzle 87 becomes higher. Accordingly, it becomes easy to satisfy the condition that the ratio (P/P0) of the total pressure (P0) of the upstream of the inlet of the supersonic nozzle 87 and the downstream static pressure (P) of the throat portion 113 of the supersonic nozzle 87 becomes smaller than the critical pressure ratio of about 0.528. By satisfying this condition, the exhaust gas 116 flows into the throat portion 113 at a speed over the sonic speed.

Thus, the flow rate of the exhaust gas 116 flowing into the throat portion 113 reaches the sonic speed, and accordingly, the shock wave is regenerated inside the supersonic nozzle 87. Accordingly, a negative pressure is generated inside the first exhaust pipe 73, and as a result, the temperature of the exhaust gas inside the first exhaust pipe 73 lowers.

When the cylinder #B is at the time of the exhaust stroke, conversely, the upstream portion 17 including the inside of the exhaust port 7 of the cylinder #A substantially functions as the branched passage 117. In other words, the shock wave 114 generated in the exhaust port 7 of the cylinder #B propagates in the upstream portion 17 (branched passage 117) on the cylinder #A side toward the cylinder #A, and is reflected by the exhaust valve 6 in a closed state. The reflected shock wave 114 propagates in the upstream portion 17 (branched passage 117) on the cylinder #A side toward the collecting portion 18, and in this collecting portion 18, collides with the exhaust gas 116 from the cylinder #B. Accordingly, the total pressure (P0) of the upstream of the inlet of the supersonic nozzle 87 rises, and the exhaust gas 116 flowing into the throat portion 113 easily reaches the sonic speed. Accordingly, a shock wave 114 can be caused in the supersonic nozzle 87, as a result, a negative pressure can be generated inside the first exhaust pipe 73. Thus, the temperature of the exhaust gas generated from the cylinder #B can be lowered.

The first to fourth cylinder upstream portions 73a to 73d in the first exhaust pipe 73 preferably have the same predetermined pipe length so as to return a shock wave 114 generated in the exhaust port 7 of another cylinder whose ignition timing is different by 360 degrees to the first or second collecting portions 73e or 73f (the collecting portion 18 of the exhaust passage 11) at an optimum timing. For example, during the exhaust stroke of the first cylinder #1, a shock wave 114 generated in the first cylinder upstream portion 73a propagates from the first collecting portion 73e to the fourth cylinder upstream portion 73d, and is reflected by the fourth cylinder upstream portion 73d and returns to the first collecting portion 73e. The time necessary for this is equal to the time necessary for the shock wave 114 generated in the fourth cylinder upstream portion 73d to be reflected by the first cylinder upstream portion 73a and return to the first collecting portion 73e. This applies to the second cylinder upstream portion 73b and the third cylinder upstream portion 73c.

Thus, the time necessary for the shock wave 114 to return to the first or second collecting portion 73e or 73f is the same among all cylinders. Accordingly, in the supersonic nozzles 87 respectively provided at the first to fourth downstream portions 73g to 73j, the speed of the exhaust gases 116 can equally increase. As a result, the pressure in all the exhaust passages 11 can be substantially uniformly lowered.

FIG. 13 to FIG. 16 show the results of simulation of the effect of the exhaust device 72 of this preferred embodiment. As a result of verification through simulation, it was discovered that the exhaust gas pressure and the exhaust gas temperature significantly lowered inside the supersonic nozzle 87.

Figure 13:
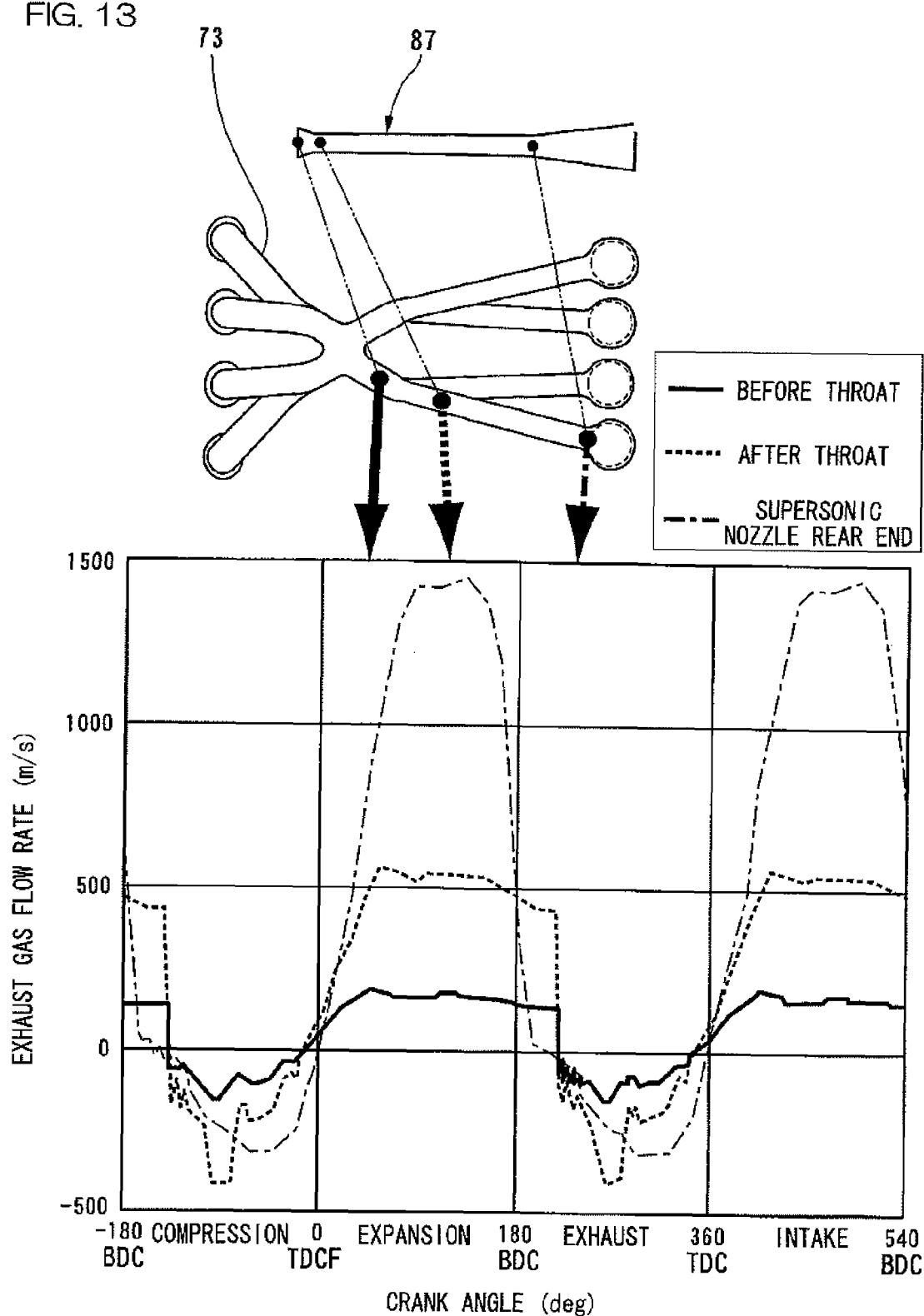
FIG. 13 is a graph showing changes in speed of the exhaust gas inside the supersonic nozzle.

FIG. 13 is a graph showing the relationship between the crank angle and the flow rate of the exhaust gas in the first exhaust pipe 73. In this figure, the solid line shows changes in flow rate of the exhaust gas before the throat portion, and the dashed line shows changes in flow rate of the exhaust gas after the throat portion, and the chain line shows changes in flow rate of the exhaust gas at the rear end of the supersonic nozzle. As is understood from this figure, the shock wave is accelerated from about 559 m/s to about 1450 m/s, for example.

Figure 14:
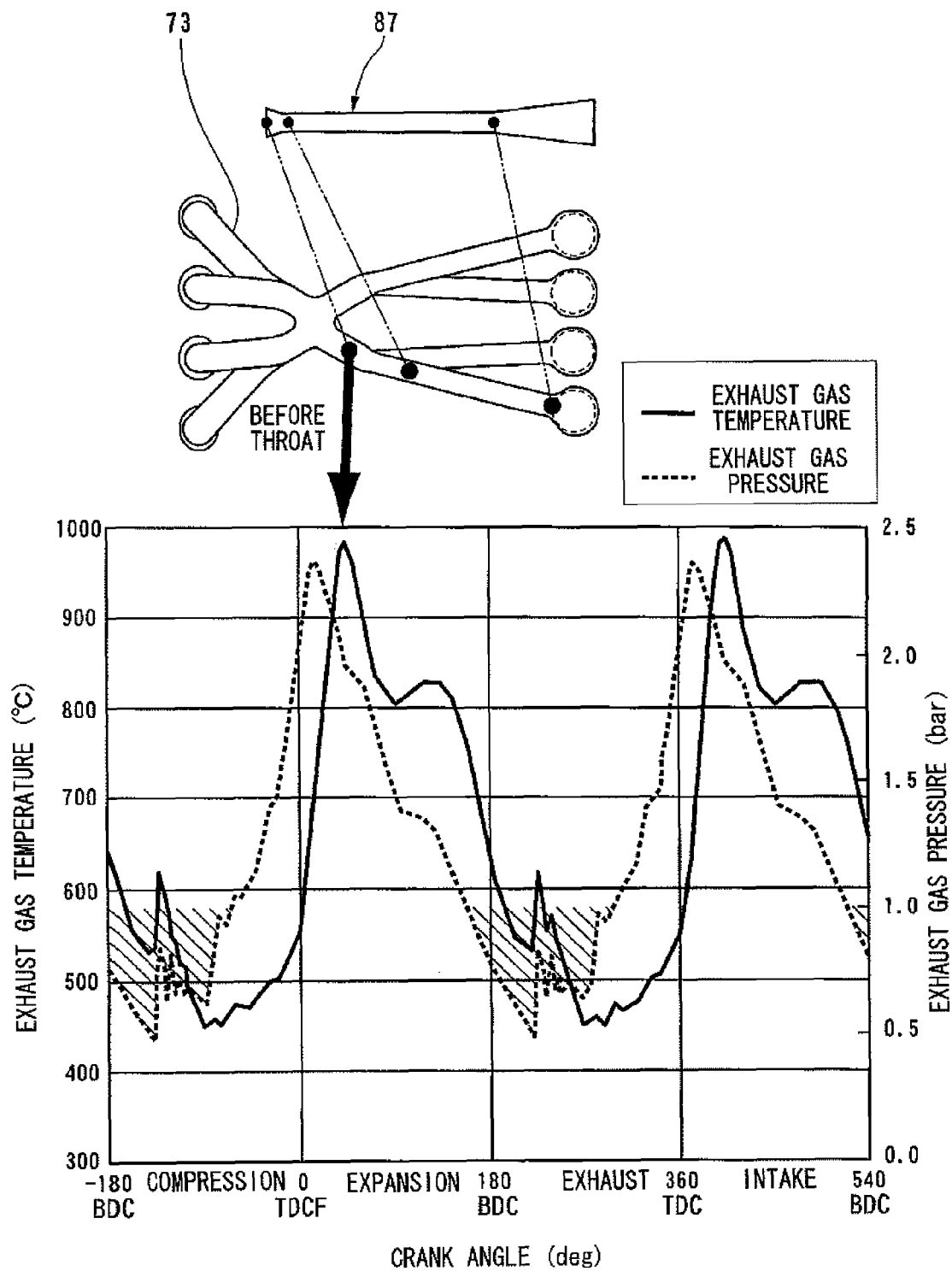
FIG. 14 is a graph showing changes in temperature and pressure of the exhaust gas before the throat.
Figure 15:
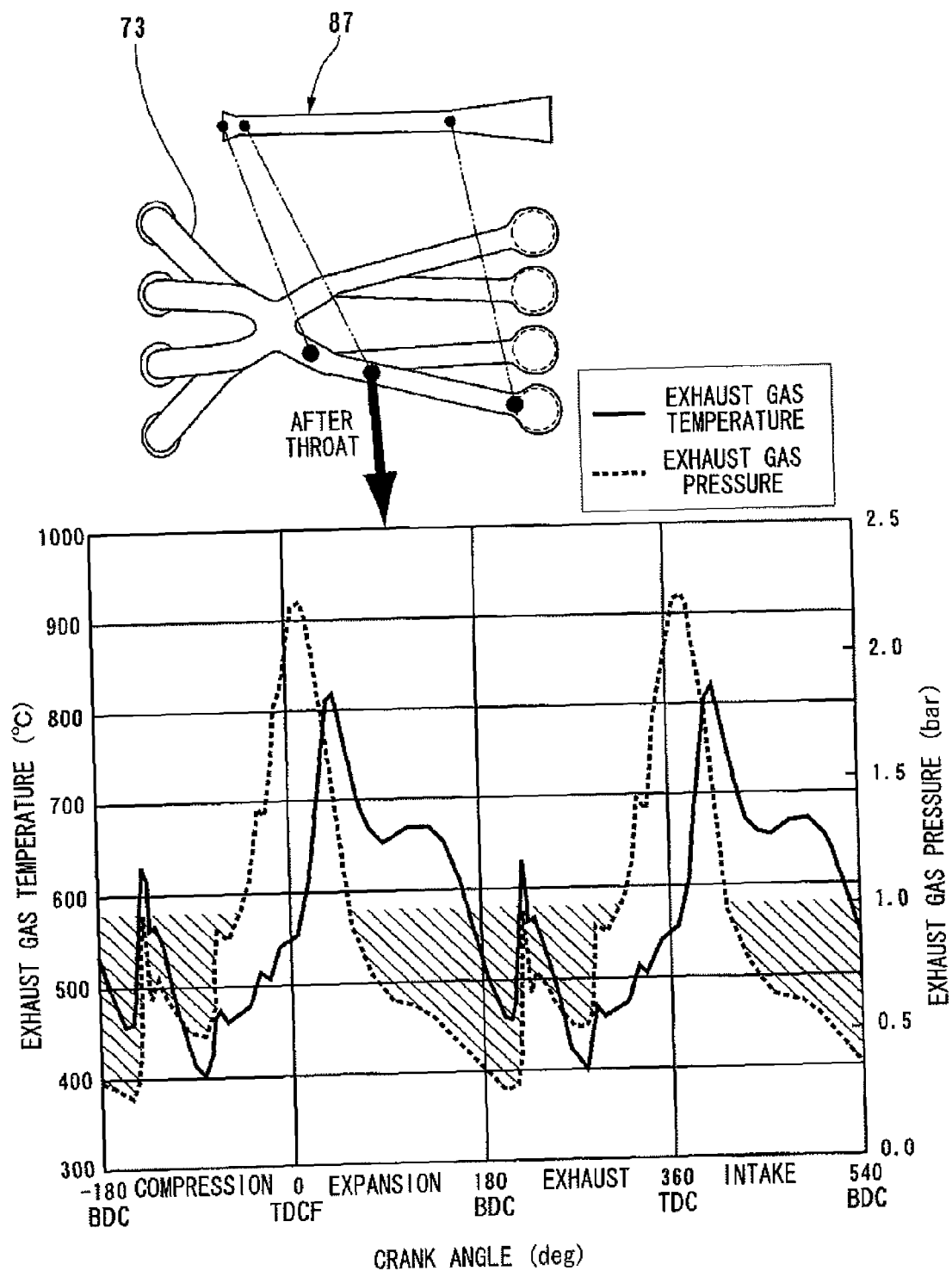
FIG. 15 is a graph showing changes in temperature and pressure of the exhaust gas after the throat.
Figure 16:
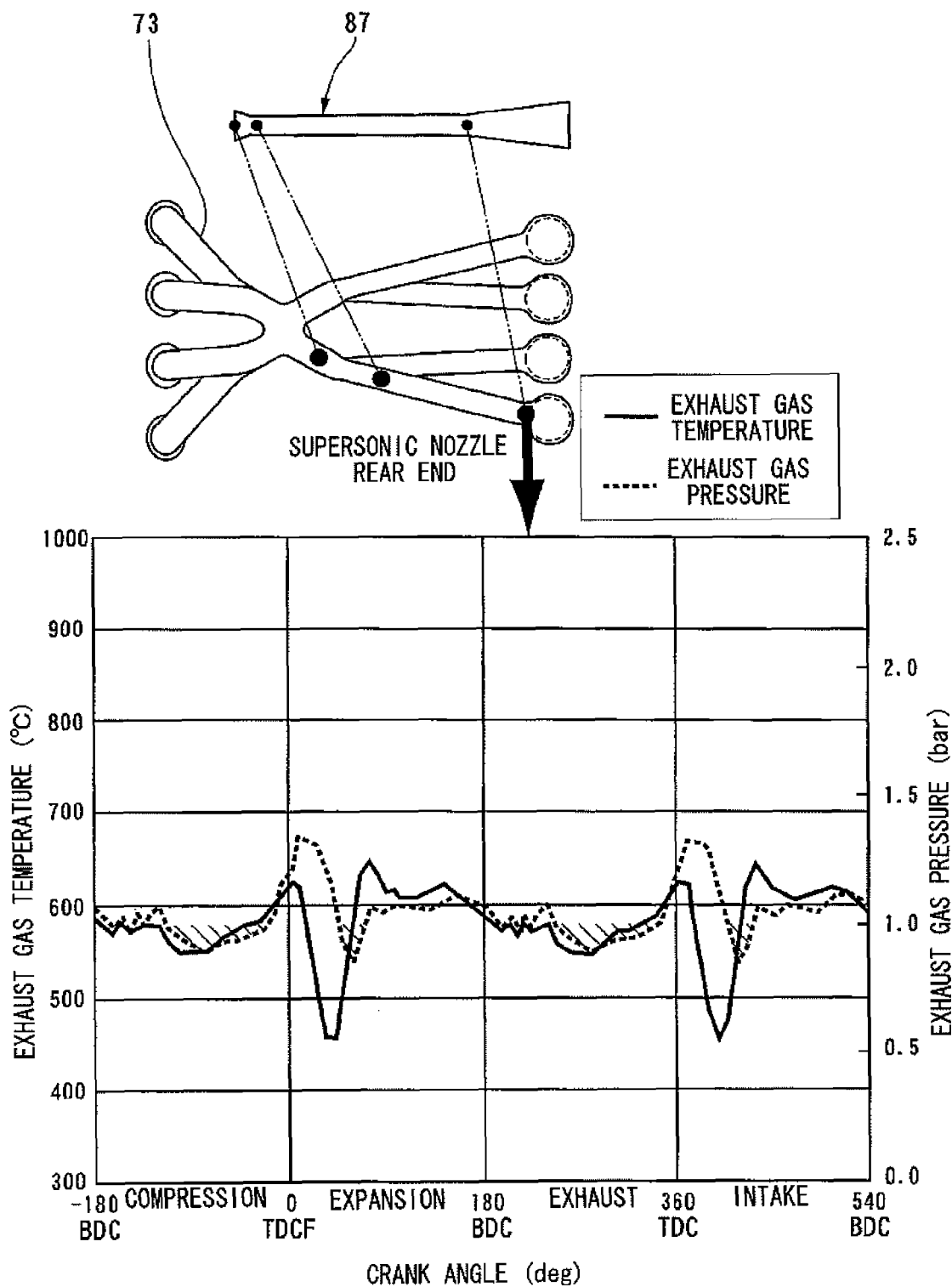
FIG. 16 is a graph showing changes in temperature and pressure of the exhaust gas at the rear end of the supersonic nozzle.

FIG. 14 to FIG. 16 are graphs showing the relationship among the crank angle, the exhaust gas temperature, and the exhaust gas pressure inside the first exhaust pipe 73. FIG. 14 shows changes in exhaust gas temperature and exhaust gas pressure before the throat portion, FIG. 15 shows changes in exhaust gas temperature and exhaust gas pressure after the throat portion, and FIG. 16 shows changes in exhaust gas temperature and exhaust gas pressure at the rear end of the supersonic nozzle. In FIG. 14 to FIG. 16, the period during which the pressure of the exhaust gas is lower than the atmospheric pressure (the inside of the exhaust pipe 53 becomes a negative pressure) is shown by hatching. As is understood from FIG. 14 to FIG. 16, the temperature of the exhaust gas suddenly lowers inside the supersonic nozzle 87 during the exhaust stroke.

The pressure of the exhaust gas, for example, as shown in FIG. 15, becomes negative not only during the exhaust stroke but for a long period. The period during which the negative pressure is thus generated and the temperature of the exhaust gas is lowered is 520 degrees of the crank angle of 720 degrees of the 4-cycle stroke, and this corresponds to about 72% of the whole stroke period.

Technical effects in the outboard motor 1 of this preferred embodiment will be illustrated hereinafter.

Exhaust gases discharged from the cylinders of the engine 2 into the upstream portions 73a to 73d of the first exhaust pipe 73 pass through the collecting portion 73e or the collecting portion 73f and are distributed into the two downstream portions 73g and 73h or the two downstream portions 73i and 73j, and flow into the respective first catalysts 78. For example, the exhaust gas which has flowed into the first cylinder upstream portion 73a passes through the first collecting portion 73e and is distributed into the first downstream portion 73g and the second downstream portion 73h. This exhaust gas flows into the first catalyst 78 connected to the first downstream portion 73g and also flows into the first catalyst 78 connected to the second downstream portion 73h. Therefore, the substantial catalyst cross-section area per cylinder is large.

Therefore, according to this preferred embodiment, as compared to an exhaust device in which the total amount of the exhaust gas discharged from one cylinder flows into one cylinder, the exhaust resistance is greatly reduced and minimized.

Further, in the exhaust device 72 of this preferred embodiment, exhaust gases do not flow concurrently into the first to fourth downstream portions 73g to 73j from the plurality of cylinders. Therefore, the influence exerted by pressure of the exhaust gas in other cylinders, that is, exhaust interference can be minimized as much as possible.

Thus, as compared to the exhaust device 72 configured such that exhaust gases of all cylinders pass through one catalyst, the exhaust resistance can be reduced, and in addition, the exhaust interference can be minimized. As a result, the pressure in the exhaust passage 11 can be lowered, so that the amount of exhaust gas remaining in the cylinders 48 due to the internal EGR can be reduced.

As a result, the temperature of intake air suctioned into the cylinders 48 in the intake stroke of the engine 2 becomes relatively low, so that an occurrence of abnormal combustion such as the above-described self-ignition and knocking can be reliably prevented.

Further, in this preferred embodiment, exhaust gas outlets 8 of cylinders are provided on the side portion of the cylinder head 3. The exhaust passage 11 inside the first exhaust pipe 73 connected to these exhaust gas outlets 8 extends from the exhaust gas outlets 8 to the vicinity of the crankshaft 41 in a plan view. Therefore, the exhaust passage 11 connected to the exhaust gas outlets 8 of the cylinders can be long. Accordingly, the pressure inside the exhaust passage 11 can be further lowered for the first and second reasons described below.

(1) First Reason

When the exhaust valve 6 opens during engine operation, an exhaust gas with a high pressure inside the cylinder 48 passes through the gap between the valve body of the exhaust valve 6 and the valve seat on the cylinder head 3 side and jets out to the exhaust port 7. It is known that the flow rate of the exhaust gas flowing in the gap reaches the sonic speed even when the number of rotations of the engine is approximately 2000 rpm. When the flow rate of the exhaust gas flowing in the gap reaches the sonic speed, and the exhaust gas flows into the exhaust port 7 with a relatively large passage cross-section area, a shock wave 114 is generated inside the exhaust port 7 (see FIG. 12A). This shock wave 114 advances toward the downstream side inside the exhaust passage 11.

Inside the exhaust passage 11 in which a shock wave 114 has been thus generated, an expansion wave 115 which advances opposite to the shock wave 114 is also generated. The pressure between the expansion wave 115 and the shock wave 114 becomes negative. According to this preferred embodiment, the exhaust passage 11 connected to the exhaust gas outlet 8 can be sufficiently long, so that the time during which the shock wave 114 and the expansion wave 115 are allowed to exist in the exhaust passage 11 becomes longer. As a result, a high negative pressure is generated inside the exhaust passage 11.

(2) Second Reason

The pressure inside the exhaust passage 11 gradually rises from the upstream side toward the downstream side according to discharge of the exhaust gas from the exhaust port 7. The exhaust passages 11 of the plurality of cylinders are collected in the exhaust chamber 7 at the downstream side, so that the pressure is also transmitted to the exhaust passages 11 of other cylinders via exhaust chamber 76. According to this preferred embodiment, the lengths of the exhaust passages 11 connected to the exhaust gas outlets 8 can be long, so that the time during which the pressure reaches the exhaust ports 7 of other cylinders can be lengthened.

In other words, it is assumed that, when an exhaust valve 6 of the first cylinder (for example, the first cylinder #1) which is ignited first between two cylinders whose ignition timings are close to each other is open, the exhaust gas is discharged to the exhaust passage 11 of the second cylinder (for example, the third cylinder #3) which is ignited second. The exhaust passages 11 are long, so that the time until the pressure of the exhaust gas of the second cylinder is transmitted to the exhaust port 7 of the second cylinder via the exhaust chamber 76 and the exhaust passage 11 is long. Therefore, when the exhaust valve 6 is open in the first cylinder, exhaust interference can be prevented and minimized by the exhaust gas of the second cylinder. Therefore, the discharge of the exhaust gas in the first cylinder can be prevented from being obstructed by the exhaust interference.

Therefore, according to this preferred embodiment, the exhaust pressure in the exhaust passage 11 can be further lowered during the exhaust stroke, so that the exhaust gas can be smoothly discharged into the exhaust passage from inside the cylinder 48. Therefore, the amount of exhaust gas remaining in the cylinder 48 due to internal EGR can be further reduced.

As a result, during the intake stroke, the temperature of intake suctioned into the cylinder 48 can be prevented from being raised by the heat of the exhaust gas. Therefore, the temperature of the intake suctioned into the cylinder 48 becomes relatively low, so that an occurrence of abnormal combustion such as self-ignition and knocking can be reliably prevented.

As shown in FIG. 4, the exhaust passage 11 of the exhaust device 72 through the vicinity of the outside of the crank case 42 from the exhaust gas outlet 8 of the cylinder head 3 and bypasses the engine 2 in a plan view, and is connected to the exhaust chamber 76 positioned on the opposite side in the width direction of the outboard motor 31. The exhaust passage 11 is connected to the main exhaust passage 77 via the exhaust chamber 76.

Therefore, the exhaust passage 11 can be formed as long as possible around the engine 1, so that a higher negative pressure can be caused inside the exhaust passage 11.

In the exhaust device 72, a supersonic nozzle 87 is provided in the first exhaust pipe 73. This supersonic nozzle 87 accelerates the exhaust gas and the flow rate of the exhaust gas reaches the sonic speed, and accordingly, a negative pressure is generated inside the first exhaust pipe 73 as described above. As a result, the temperature of the exhaust gas in the first exhaust pipe 73 lowers.

Therefore, according to this preferred embodiment, due to the negative pressure, the exhaust gas in the cylinder 48 is efficiently discharged to the exhaust passage 11. As a result, the amount of exhaust gas remaining in the cylinder 48 due to internal EGR can be further reduced. Therefore, according to the preferred embodiment, during operation of the engine 2, it becomes much more difficult for self-ignition and knocking to occur.

In this preferred embodiment, by lowering the temperature of the exhaust gas by the operation of the supersonic nozzle 87, the exhaust gas at a relatively low temperature can be made to flow into the first catalyst 78. Therefore, an occurrence of the above-described sintering phenomenon can be more reliably prevented.

Further, the first exhaust pipe 73 of this preferred embodiment is preferably formed by integrally molding by casting the plurality of tubular portions (first to fourth upstream portions 73a to 73d, the first and second collecting portions 73e and 73f, and the first to fourth downstream portions 73g to 73j). Therefore, as compared to the case where the first exhaust pipe 73 is formed by welding a plurality of pipes, the manufacturing cost of the first exhaust pipe 73 can be reduced.

Further, the four upstream portions 73a to 73d and the four downstream portions 73g to 73h are connected to each other by the collecting portions 73e and 73f, so that the rigidity of the first exhaust pipe 73 increases. Further, the second exhaust pipe 74 and the third exhaust pipe 75 are also integrally formed preferably by casting such that the four tubular portions 74a and 75a are integrated, respectively. Therefore, the areas of the connecting portions between the exhaust pipe assembly formed of the first, second, and third exhaust pipes 73, 74, 75 and the cylinder head 3, and between the exhaust pipe assembly and the exhaust chamber 76 can be formed to be wide. Therefore, the sealing performance of the connecting portions can be improved.

Further, in this preferred embodiment, two pairs of catalysts each pair of which includes the first catalyst 78 and the second catalyst 79 are connected to one cylinder. The exhaust gas discharged from each cylinder is purified by these two first and second catalysts 78 and 79.

When the first and second catalysts 78 and 79 are made of a ternary catalyst, if the flow rate of the exhaust gas passing through the catalysts 78 and 79 is high, redox reaction hardly occurs in the catalysts 78 and 79, and the exhaust gas purifying efficiency of the catalysts 78 and 79 lowers. To solve this problem, the space velocity S/V value when the exhaust gas passes through the catalysts 78 and 79 is preferably lowered. The S/V value can be obtained from the following mathematical formula (3).

$$S/V \text{ value} = \frac{\text{displacement} \times \text{engine speed} \times \text{coefficient} \times \text{inhalation efficiency}}{2 \times \text{catalyst volume}} \quad (3)$$

In the mathematical formula (3), the coefficient is 1 in the case of a 4-cycle engine, and is 2 in the case of a 2-cycle engine. The inhalation efficiency can be set to, for example, 0.75. The catalyst volume can be obtained from the following mathematical formula (4).

$$\text{Catalyst volume (cm}^3\text{)} = (\text{Catalyst outer diameter})^2 \times \pi \times (\text{foil length}) \times \frac{1}{4} \times 10^{-3} \quad (4)$$

In this preferred embodiment, four catalysts (two first and second catalysts 78 and 79) are preferably provided for one cylinder, for example, so that the catalyst volume is increased and the S/V value can be reduced. Therefore, the flow rate of the exhaust gas passing through the first and second catalysts 78 and 79 can be lowered, and the exhaust gas purifying efficiency can be increased.

In this preferred embodiment, the first catalyst 78 and the second catalyst 79 preferably are separately arranged on the upstream side and the downstream side, so that the outer diameters of the catalysts can be formed to be small when the catalyst volume is increased. Therefore, the catalyst volume can be increased while preventing the outboard motor 31 from increasing in size.

Further, the first catalyst 78 is arranged ahead of the crank case 42 (on the opposite side of the cylinder body 43 with respect to the crank case 42). Therefore, the distance between the exhaust gas outlet 8 of the cylinder head 3 and the first catalyst 78 can be set as long as possible. Therefore, the first catalyst 78 can be arranged at a position at which the temperature thereof does not excessively rise.

On the other hand, in the exhaust device 72 of this preferred embodiment, the inside of the exhaust chamber 76 is partitioned by the partition 95 into the upstream exhaust gas chamber 93 and the downstream exhaust gas chamber 94. The communicating hole 97 is formed in the partition 95, and the on-off valve 98 which opens and closes this communicating hole 97 is provided. Therefore, by closing the on-off valve 98, the exhaust passage 11 can be closed inside the exhaust chamber 76. Accordingly, the exhaust passage 11 on the upstream side of the exhaust chamber 76 can be shut off from the main exhaust passage 77 on the downstream side.

Therefore, in the outboard motor 31 of this preferred embodiment, when water flows back inside the main exhaust passage 77, the water can be prevented by the exhaust chamber 76 from reaching the engine 2 through the first to third exhaust pipes 73 to 75 and the catalysts 78 and 79.

The reversed flow of water inside the main exhaust passage 77 occurs in rare cases when the shift position is switched to "reverse" by the forward-reverse switching mechanism 46 to brake the hull when the hull moves ahead. In other words, while the hull moves ahead at high speed, when the forward-reverse switching mechanism 46 of the outboard motor 31 is switched to the reverse side, the propeller 36 is subjected to a strong force due to water. If this force exceeds the driving force of the engine 2, the drive shaft 45 (engine 2) is rotated in reverse.

When the engine 2 is thus rotated in reverse, the piston lowers while the exhaust valve 6 is open, and the exhaust gas in the exhaust passage 11 is suctioned into the cylinder 48. As the time during which the engine 2 rotates in reverse becomes longer, the amount of the exhaust gas suctioned into the engine 2 becomes larger, and the negative pressure inside the exhaust passage 11 becomes higher. Due to this negative pressure, water rises inside the main exhaust passage 77. When the outboard motor 31 is used at sea, seawater enters the exhaust passage.

When seawater enters the inside of the exhaust passage 11 and comes into contact with the catalysts 78 and 79, the seawater poisons and deteriorates the catalysts 78 and 79 due to constituents of seawater such as Na, Mg, and Cl, etc. If water is poured on the catalysts 78 and 79 at a high temperature, sudden shrinkage may occur and crack the catalysts 78 and 79. Further, if water goes upstream in the exhaust passage 11 and is suctioned into the engine 2, a so-called water hammer phenomenon may occur and break the engine 2.

In the outboard motor 31 of this preferred embodiment, as described above, when water goes upstream inside the exhaust passage 11 (when the engine 2 rotates in reverse or the inside of the exhaust chamber 76 becomes an excessively low pressure), the on-off valve 98 in the exhaust chamber 76 closes. Accordingly, the water going upstream can be stopped by the exhaust chamber 76, so that water can be reliably prevented from being suctioned into the engine 2 through the first to third exhaust pipes 73 to 75.

Therefore, it can be reliably prevented that the catalysts 78 and 79 are contacted and deteriorated by seawater, and that the catalysts 78 and 79 at a high temperature are suddenly cooled and broken by water. Of course, an occurrence of the water hammer phenomenon can also be prevented.

Third Preferred Embodiment

Next, a third preferred embodiment of the present invention will be described with reference to FIG. 17, FIG. 18, FIG. 19A and FIG. 19B. In these figures, members identical or equivalent to those described in FIG. 1 to FIG. 18 will be represented with the same reference numerals, and detailed description thereof will be omitted as appropriate.

Figure 17:
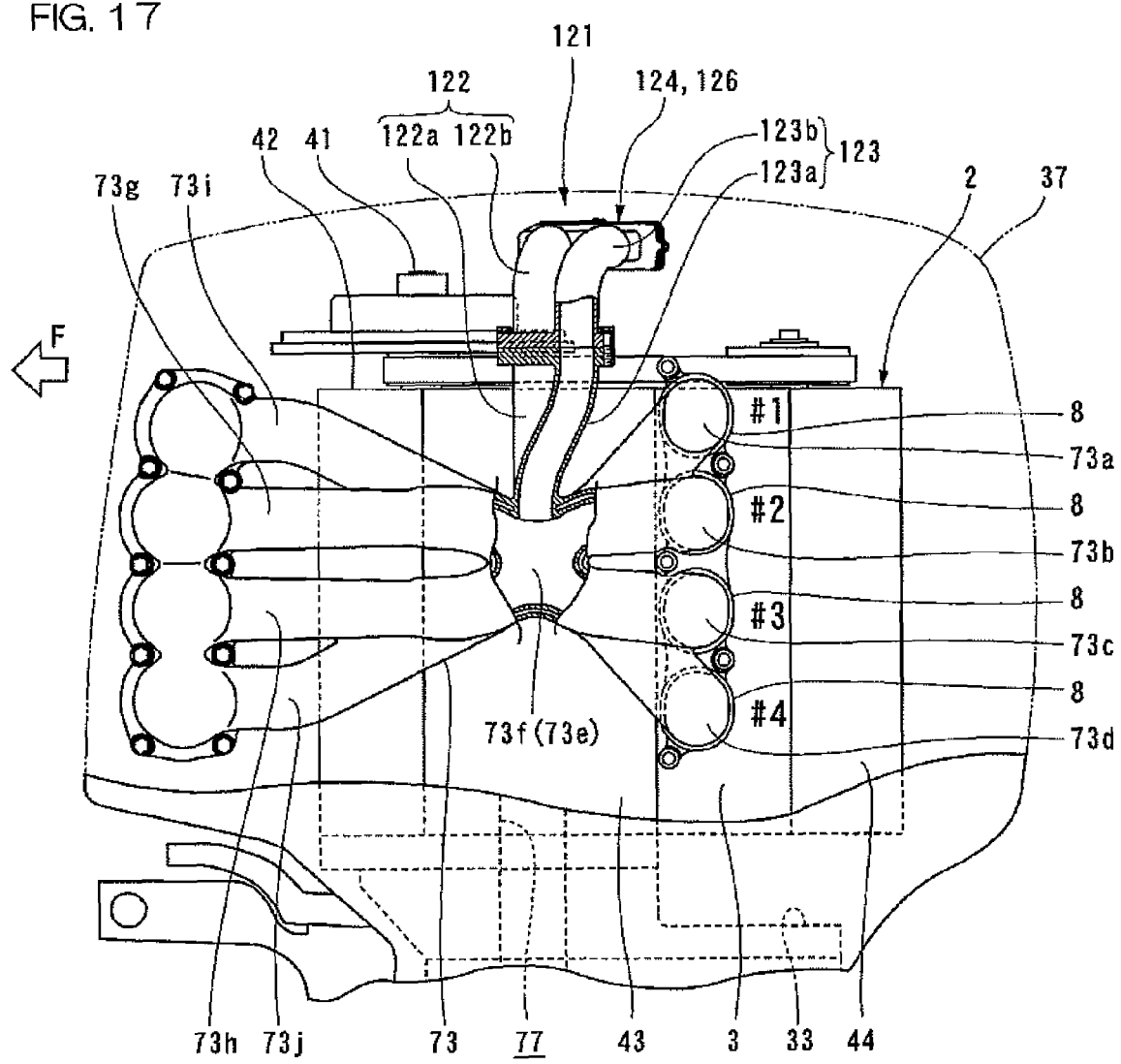
FIG. 17 is a side view of an outboard motor of a third preferred embodiment of the present invention, showing a configuration of an exhaust pipe to which a secondary air introducing pipe is connected.
Figure 18:
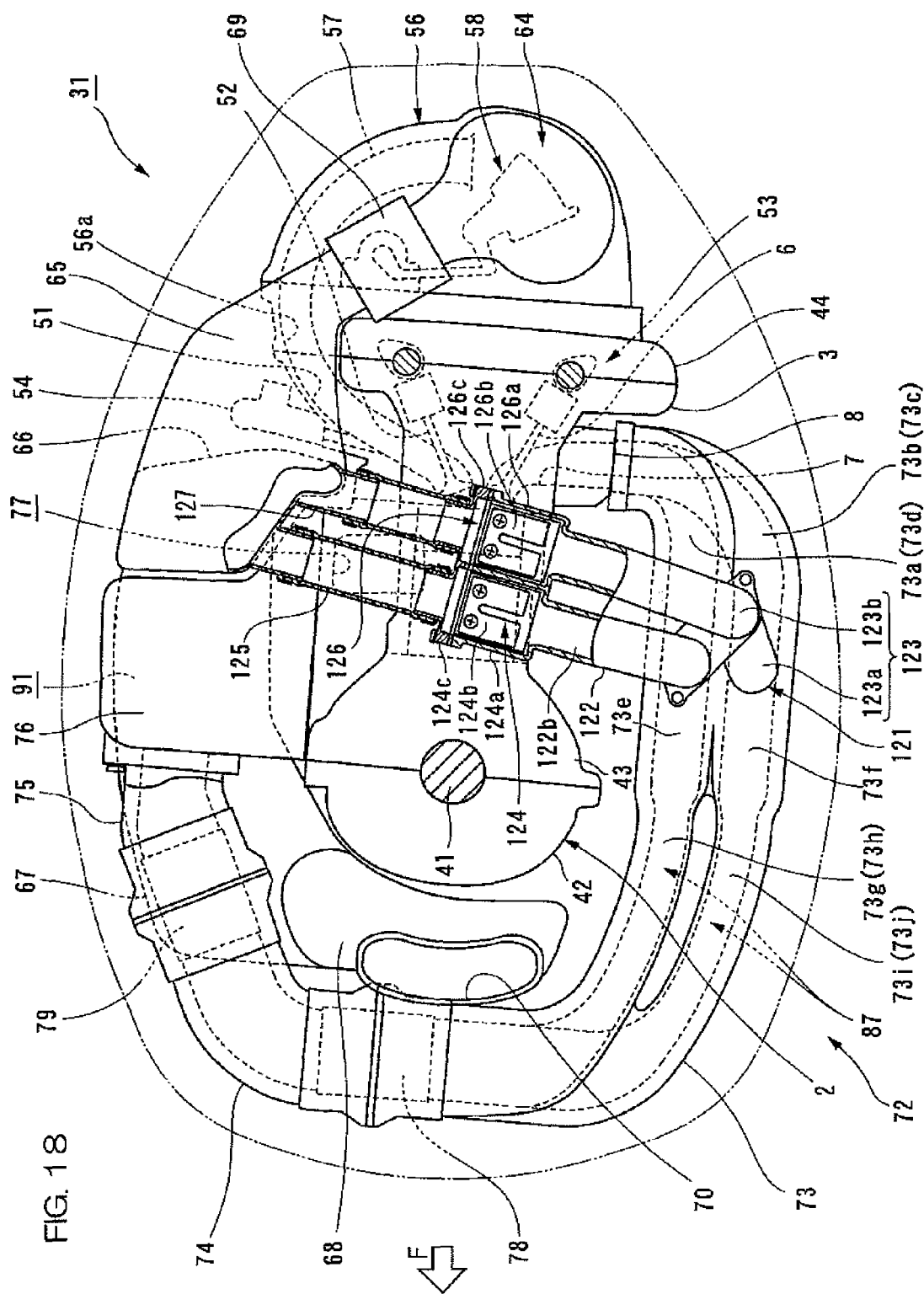
FIG. 18 is a plan view of the outboard motor of the third preferred embodiment, showing a configuration of an exhaust pipe to which a secondary air introducing pipe is connected.

FIG. 17 is a side view of an outboard motor 31, and mainly shows a configuration of a first exhaust pipe 73. In addition, FIG. 18 is a plan view of the outboard motor 31. In this preferred embodiment, to the first collecting portion 73e and the second collecting portion 73f of the first exhaust pipe 73, a secondary air introducing pipe 121 is connected. From this secondary air introducing pipe 121, secondary air is respectively introduced into the first collecting portion 73e and the second collecting portion 73f. "Secondary air" means air which has not passed through the insides of the cylinders 48 of the engine 2.

The secondary air introducing pipe 121 preferably includes a first secondary air introducing pipe 122 and a second secondary air introducing pipe 123. The first secondary air introducing pipe 122 extends in the up-down direction, and the lower end thereof is connected to the first collecting portion 73e. The second secondary air introducing pipe 123 extends in the up-down direction, and the lower end thereof is connected to the second collecting portion 73f.

The first secondary air introducing pipe 122 is connected to the intake duct 64 via a first reed valve 124 and a first communicating pipe 125. The second secondary air introducing pipe 123 is connected to the intake duct 64 via a second reed valve 126 and a second communicating pipe 127. The first and second reed valves 124 and 126 prevent the exhaust gas from flowing into the intake system from the secondary air introducing pipe 121. In other words, in the first and second reed valves 124 and 126, valve bodies 124a and 126a (see FIG. 19B) opens when a negative pressure is generated inside the first exhaust pipe 73, and only secondary air is made flow to the secondary air introducing pipe 121 side from the intake dust 64 side.

Figure 19A:
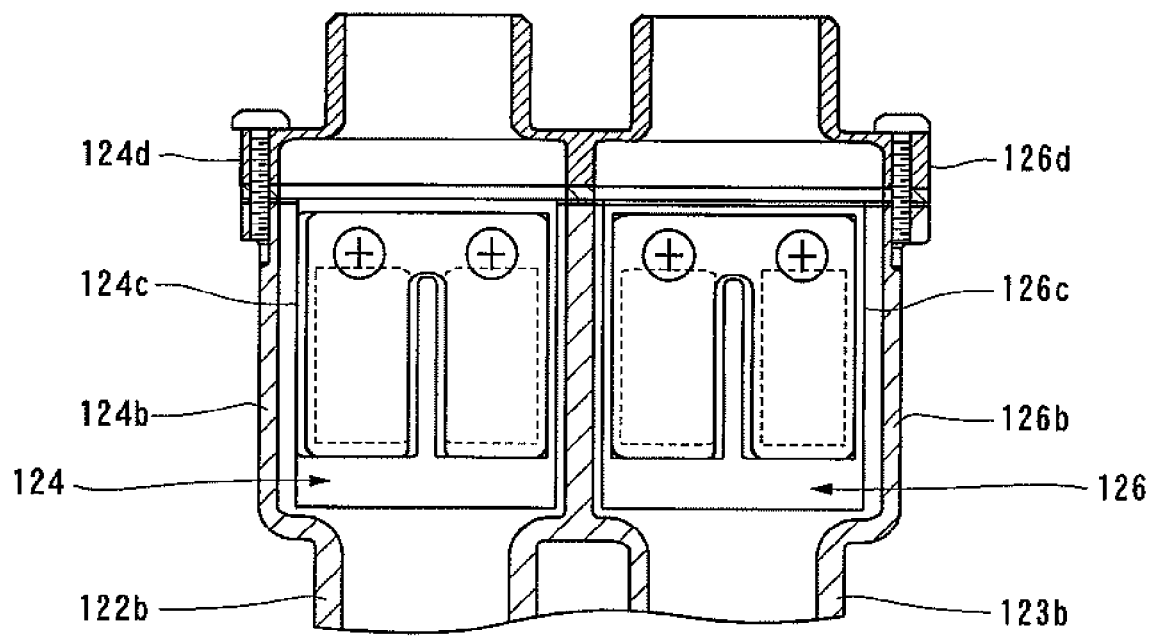
FIG. 19A is a cross-sectional view of the reed valves.
Figure 19B:
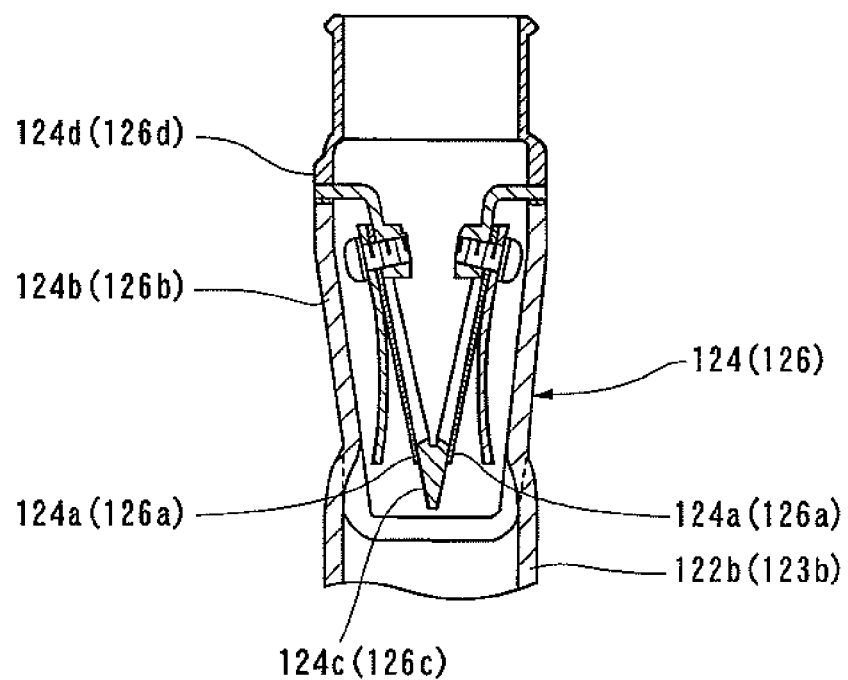
FIG. 19B is a longitudinal sectional view of the same.

The first and second secondary air introducing pipes 122 and 123 preferably include lower portions 122a and 123a preferably formed by casting integrally with the first exhaust pipe 73, and upper portions 122b and 123b attached to the upper ends of the lower portions. The upper portions 122b and 123b are bent so as to extend across the engine 2 in the width direction of the outboard motor 31 (direction crossing the direction in which the crank case 42 and the cylinder body 43 are lined up in a plan view) above the engine 2 as shown in FIG. 18. On the upper portion 122b of the first secondary air introducing pipe 122, as shown in FIGS. 19A and 19B, a valve housing 124b of the first reed valve 124 is preferably formed integrally. On the upper portion 123b of the second secondary air introducing pipe 123, a valve housing 126b of the second reed valve 126 is preferably integrally provided.

FIG. 19A is a cross-sectional view of the reed valves 124 and 126, and FIG. 19B is a longitudinal sectional view of reed valves 124 and 126. The first and second reed valves 124 and 126 include, valve housings 124b and 126b, reed valve main bodies 124c and 126c inserted in the valve housings 124b and 126b, and covers 124d and 126d which form air passages in cooperation with the valve housings 124b and 126b. The cover 124d of the first reed valve 124 is connected to the first communicating pipe 125, and the cover 126d of the second reed valve 126 is connected to the second communicating pipe 127.

In the exhaust device 72 of this preferred embodiment, when the inside of the first exhaust pipe 73 becomes a negative pressure, air is suctioned into the first exhaust pipe 73 through the secondary air introducing pipe 121.

Generally, the outboard motor 31 preferably is mostly used for a long time in an operating state in which the output of the engine becomes maximum. In such an operating state, when the air-fuel ratio during engine operation (hereinafter, this air-fuel ratio will be referred to as "combustion air-fuel ratio")

is set to a theoretical air-fuel ratio to improve the exhaust gas purifying efficiency of the catalysts, the combustion temperature becomes excessively high. Accordingly, problems such as melting of the piston and deterioration of the valve seat may occur.

According to the exhaust device 72 of this preferred embodiment, when the inside of the first exhaust pipe 73 becomes negative pressure, secondary air is suctioned into the first exhaust pipe 73 from the secondary air introducing pipe 121. Accordingly, while high purifying efficiency of the catalysts 78 and 79 is maintained, the combustion temperature can be lowered by setting the combustion air-fuel ratio to the richer side than the theoretical air-fuel ratio. In other words, the exhaust gas and the secondary air flow to the catalysts 78 and 79, so that even if oxygen in the exhaust gas is short due to the richer combustion air-fuel ratio, supplemental oxygen can be supplied by the secondary air. Therefore, even when the combustion air-fuel ratio is set to the richer side than the theoretical air-fuel ratio, toxic components in the exhaust gas can be sufficiently purified by the catalysts 78 and 79.

Therefore, while the state in which a clean exhaust gas is discharged is maintained, the combustion temperature can be lowered by setting the combustion air-fuel ratio to the richer side than the theoretical air-fuel ratio. As a result, the inside of the exhaust passage 11 becomes a negative pressure and the amount of exhaust gas remaining inside the cylinder 48 of the engine 2 is reduced, and in addition, by making richer the combustion air-fuel ratio, the combustion temperature can be lowered. Accordingly, an occurrence of abnormal combustion such as self-ignition and knocking in the engine 2 can be more reliably prevented.

By setting the combustion air-fuel ratio to the richer side than the theoretical air-fuel ratio, the members inside the combustion chamber can be cooled by the vaporization heat of the fuel. Therefore, according to this preferred embodiment, the inner surface of the combustion chamber is cooled by the fuel, so that problems caused by excessive temperature rise inside the combustion chamber, that is, melting of the piston and deterioration of the valve seat, can be prevented.

The temperature of the secondary air is substantially the temperature of the atmosphere, and is much lower than the temperature of the exhaust gas. Therefore, according to this preferred embodiment, the temperature of the exhaust gas can be lowered by the large amount of secondary air at the relatively low temperature introduced into the exhaust passage 11. Accordingly, at the catalysts 78 and 79, an occurrence of the sintering phenomenon described above can be more reliably prevented.

Further, in this preferred embodiment, the upstream portion of the secondary air introducing passage is connected to the intake duct 64 via the reed valves 124 and 126. Therefore, intake noise caused by suctioning of the air into the secondary air introducing passage and seating noise caused when the valve bodies 124a and 126a of the reed valves 124 and 126 seat on the valve seats can be reduced by the intake duct 64. Therefore, noise caused from the secondary air introducing passage can be reduced.

The intake duct 64 to which the secondary air introducing passage is connected preferably has a U shape (see FIG. 6) extending from the upper end to the lower end of the engine 2 in a side view. Therefore, even if water entering inside the engine cover 37 is suctioned into the intake duct 64 together with intake air, the water can be prevented from entering so as not to cause problems. The intake air flowing into the air suction port 70 of the intake duct 64 lowers inside the upstream side vertical portion 68 and collides with the bottom or the wall around the bottom of the upstream side horizontal portion 67 and changes its direction, and rises inside the downstream side vertical extending portion 66. Accordingly, entry of water can be prevented.

In other words, even when the outboard motor 31 is used at sea and seawater is suctioned into the intake duct 64 together with intake air, seawater adheres to the bottom or the wall around the bottom of the upstream side horizontal portion 67, and accordingly, the amount of seawater contained in the intake air can be reduced. By thus reducing the amount of seawater contained in the intake air, although this intake air is introduced into the exhaust passage 11 as secondary air, the catalysts 78 and 79 can be protected from corrosion caused by the salt content in seawater.

Further, in this preferred embodiment, the secondary air introducing pipe 121 is connected to the first exhaust pipe 73 including the supersonic nozzle 87. A negative pressure can be generated inside the exhaust passage 11 by the operation of the supersonic nozzles 87, so that more secondary air can be suctioned into the exhaust passage 11.

A negative pressure is continuously generated inside the exhaust passage 11 by the supersonic nozzle 87 even when the speed of the engine 2 becomes higher than the speed of the maximum output. In a general engine, in the high-speed operation range, the pressure of the exhaust gas becomes relatively high, so that the secondary air suction amount is greatly reduced. However, according to this preferred embodiment, a high negative pressure is generated inside the exhaust passage 11 even in this high-speed operation range, so that secondary air can be sufficiently introduced into the exhaust passage 11. As a result, without using an air pump for forcibly blowing secondary air into the exhaust passage 11, a sufficient supply amount of secondary air as much as the supply amount in the case where such an air pump is adopted can be actively introduced into the exhaust passage 11.

Preferred embodiments of the present invention are described in detail above, and these are merely detailed examples used for making clear the technical content of the present invention, and the present invention should not be construed as being limited to these detailed examples, and the spirit and scope of the present invention are limited only by the appended claims.

The present application corresponds to Japanese Patent Application No. 2008-188428 filed on Jul. 22, 2008 to the Japan Patent Office, and whole disclosure of this application is incorporated in its entirety herein by reference.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An exhaust device for an outboard motor engine including a plurality of cylinders, the exhaust device comprising:
   an exhaust passage having a first end connected to the engine, and a second end;
   an exhaust chamber connected to the second end of the exhaust passage and to a main exhaust passage positioned below the engine; wherein
   the exhaust passage includes:
      a plurality of upstream portions each provided for a respective one of the plurality of cylinders and having inlet ends connected to exhaust gas outlets of the plurality of cylinders whose exhaust valve opening periods are different;
      a collecting portion arranged to connect outlet ends of the plurality of upstream portions to each other; and a plurality of downstream portions which are branched from the collecting portion and connected commonly to the exhaust chamber;

a plurality of catalysts arranged such that one of the plurality of catalysts is provided in each of the plurality of downstream portions; and nozzles disposed on upstream sides of the catalysts in the downstream portions of the exhaust passage, wherein each of the nozzles has a narrowing portion at which a cross-section area of an exhaust path is gradually reduced toward a downstream side thereof, and an expanding portion at which the cross-section area of the exhaust path gradually increases toward the downstream side between the narrowing portion and the catalyst; wherein the nozzles are supersonic nozzles.

2. The exhaust device according to claim 1, further comprising an air introducing passage connected to the collecting portion of the exhaust passage.

3. An outboard motor comprising:

an engine including a plurality of cylinders and arranged to support a crankshaft extending along an up-down direction of the outboard motor;

an exhaust passage having a first end connected to the engine, and a second end;

an exhaust chamber connected to the second end of the exhaust passage and to a main exhaust passage positioned below the engine; wherein the exhaust passage includes:

a plurality of upstream portions each provided for a respective one of the plurality of cylinders and having inlet ends connected to exhaust gas outlets of the plurality of cylinders whose exhaust valve opening periods are different;

a collecting portion arranged to connect outlet ends of the plurality of upstream portions to each other; and a plurality of downstream portions which are branched from the collecting portion and connected commonly to the exhaust chamber;

a plurality of catalysts arranged such that one of the plurality of catalysts is provided in each of the plurality of downstream portions; and nozzles disposed on upstream sides of the catalysts in the downstream portions of the exhaust passage, wherein each of the nozzles has a narrowing portion at which a cross-section area of an exhaust path is gradually reduced toward a downstream side thereof, and an expanding portion at which the cross-section area of the exhaust path gradually increases toward the downstream side between the narrowing portion and the catalyst; wherein the nozzles are supersonic nozzles.

4. The outboard motor according to claim 3, further comprising an air introducing passage connected to the collecting portion of the exhaust passage.

5. An exhaust device for an outboard motor engine including a plurality of cylinders, the exhaust device comprising:

an exhaust passage having a first end connected to the engine, and a second end;

an exhaust chamber connected to the second end of the exhaust passage and to a main exhaust passage positioned below the engine; wherein the exhaust passage includes:

a plurality of upstream portions each provided for a respective one of the plurality of cylinders and having inlet ends connected to exhaust gas outlets of the plurality of cylinders whose exhaust valve opening periods are different;

a collecting portion arranged to connect outlet ends of the plurality of upstream portions to each other; and a plurality of downstream portions which are branched from the collecting portion and connected commonly to the exhaust chamber;

a plurality of catalysts arranged such that one of the plurality of catalysts is provided in each of the plurality of downstream portions; and an air introducing passage directly connected to the collecting portion of the exhaust passage.

6. An exhaust device for an outboard motor engine including a plurality of cylinders, the exhaust device comprising:

an exhaust passage having a first end connected to the engine, and a second end;

an exhaust chamber connected to the second end of the exhaust passage and to a main exhaust passage positioned below the engine; wherein the exhaust passage includes:

a plurality of upstream portions each provided for a respective one of the plurality of cylinders and having inlet ends connected to exhaust gas outlets of the plurality of cylinders whose exhaust valve opening periods are different;

a collecting portion arranged to connect outlet ends of the plurality of upstream portions to each other; and a plurality of downstream portions which are branched from the collecting portion and connected commonly to the exhaust chamber;

a plurality of catalysts arranged such that one of the plurality of catalysts is provided in each of the plurality of downstream portions; and an air introducing passage directly connected to the collecting portion of the exhaust passage.

* * * * *